(12) United States Patent
Smiddy

(10) Patent No.: US 9,682,876 B2
(45) Date of Patent: Jun. 20, 2017

(54) SYSTEM AND METHOD FOR THE TREATMENT OF WASTEWATER

(75) Inventor: Frank Leslie Smiddy, Ludington, MI (US)

(73) Assignee: ProAct Services Corporation

( * ) Notice: Subject to any disclaimer, the term of this patent is extended or adjusted under 35 U.S.C. 154(b) by 0 days.

(21) Appl. No.: 13/470,894

(22) Filed: May 14, 2012

(65) Prior Publication Data

US 2012/0285895 A1    Nov. 15, 2012

Related U.S. Application Data

(60) Provisional application No. 61/546,667, filed on Oct. 13, 2011, provisional application No. 61/485,964, filed on May 13, 2011.

(51) Int. Cl.

| | |
|---|---|
| B01D 21/00 | (2006.01) |
| C02F 1/52 | (2006.01) |
| B01D 21/24 | (2006.01) |
| B01D 24/38 | (2006.01) |
| B01D 61/00 | (2006.01) |
| B01D 29/88 | (2006.01) |
| C02F 9/00 | (2006.01) |
| B01D 29/50 | (2006.01) |
| C02F 1/56 | (2006.01) |
| B03D 3/06 | (2006.01) |
| B01D 21/01 | (2006.01) |
| C02F 1/68 | (2006.01) |
| C02F 1/66 | (2006.01) |
| C02F 1/00 | (2006.01) |
| B01D 37/00 | (2006.01) |
| B01D 35/00 | (2006.01) |
| B01D 35/28 | (2006.01) |

(Continued)

(52) U.S. Cl.
CPC ............... *C02F 1/56* (2013.01); *B01D 21/01* (2013.01); *B03D 3/06* (2013.01); *C02F 1/66* (2013.01); *C02F 1/686* (2013.01); *C02F 1/001* (2013.01); *C02F 1/44* (2013.01); *C02F 2201/008* (2013.01); *C02F 2209/005* (2013.01); *C02F 2209/06* (2013.01); *C02F 2209/11* (2013.01); *C02F 2209/42* (2013.01)

(58) Field of Classification Search
None
See application file for complete search history.

(56) References Cited

U.S. PATENT DOCUMENTS 3,433,312 A * 3/1969 Burdyn et al. ............... 175/66
3,831,758 A * 8/1974 Watson, Jr. .............. B03D 1/24
210/199

(Continued)

*Primary Examiner* — Clare Perrin
(74) *Attorney, Agent, or Firm* — Belles Katz LLC

(57) ABSTRACT

A system and method for the treatment of wastewater. In one aspect, the invention can be a method of treating wastewater comprising: a) introducing wastewater having a first turbidity level into a wastewater treatment system; b) injecting an aqueous polymer mixture into the wastewater to flocculate suspended solids within the wastewater; c) removing the flocculated suspended solids from the wastewater to form a treated water having a second turbidity, the second turbidity being lower than the first turbidity; and wherein the aqueous polymer mixture of step b) is formed by introducing a raw polymer into a re-circulated portion of the treated water.

15 Claims, 19 Drawing Sheets

(51) Int. Cl.
  *B01D 24/00* (2006.01)
  *B01D 29/00* (2006.01)
  *C02F 1/44* (2006.01)

(56) References Cited

U.S. PATENT DOCUMENTS

| | | | |
|---|---|---|---|
| 4,145,279 A | 3/1979 | Selby, III | |
| 4,243,522 A | 1/1981 | Ter-Borch et al. | |
| 4,367,145 A * | 1/1983 | Simpson et al. | 210/241 |
| 4,372,851 A | 2/1983 | Mandt | |
| 4,477,353 A * | 10/1984 | Messer | 210/633 |
| 4,536,286 A | 8/1985 | Nugent | |
| 4,710,290 A * | 12/1987 | Briltz | B01D 21/0045 |
| | | | 210/199 |
| 4,800,021 A | 1/1989 | Desbos | |
| 4,855,061 A * | 8/1989 | Martin | 210/709 |
| 4,927,543 A | 5/1990 | Bablon et al. | |
| 4,999,103 A | 3/1991 | Bogart | |
| 5,019,268 A | 5/1991 | Rogalla | |
| 5,137,636 A | 8/1992 | Bundgaard | |
| 5,160,043 A | 11/1992 | Kos | |
| 5,192,441 A | 3/1993 | Sibony et al. | |
| 5,213,681 A | 5/1993 | Kos | |
| 5,314,621 A | 5/1994 | Rogalla | |
| 5,364,537 A | 11/1994 | Paillard | |
| 5,366,622 A * | 11/1994 | Geyer | 210/199 |
| 5,422,012 A * | 6/1995 | Adams | 210/712 |
| 5,460,723 A | 10/1995 | Bourbigot et al. | |
| 5,520,803 A | 5/1996 | Russel et al. | |
| 5,536,407 A | 7/1996 | Petersen | |
| 5,544,598 A | 8/1996 | Guibelin et al. | |
| 5,547,578 A | 8/1996 | Nielsen | |
| 5,589,068 A | 12/1996 | Nielsen | |
| 5,607,593 A | 3/1997 | Cote et al. | |
| 5,635,073 A | 6/1997 | Aktor et al. | |
| 5,650,069 A | 7/1997 | Hong et al. | |
| 5,667,688 A | 9/1997 | Kerrn-Jespersen et al. | |
| 5,725,757 A | 3/1998 | Binot | |
| 5,795,481 A | 8/1998 | Lesouef | |
| 5,800,701 A | 9/1998 | Larsen | |
| 5,858,768 A | 1/1999 | Bonnin et al. | |
| 5,908,554 A | 6/1999 | Tholander et al. | |
| 5,932,099 A | 8/1999 | Cote et al. | |
| 5,948,275 A | 9/1999 | Djafer et al. | |
| 5,954,964 A | 9/1999 | Nielsen et al. | |
| 6,010,631 A | 1/2000 | Delsalle et al. | |
| 6,068,047 A | 5/2000 | Buchhave | |
| 6,117,203 A | 9/2000 | Buchhave et al. | |
| 6,129,104 A | 10/2000 | Ellard et al. | |
| 6,174,434 B1 | 1/2001 | Krofta | |
| 6,197,190 B1 | 3/2001 | Hanlon | |
| 6,238,562 B1 | 5/2001 | Nielsen et al. | |
| 6,290,849 B1 | 9/2001 | Rykaer et al. | |
| 6,325,933 B1 | 12/2001 | Nielsen et al. | |
| 6,325,935 B1 | 12/2001 | Hojsgaard | |
| 6,632,365 B1 | 10/2003 | Payraudeau et al. | |
| 6,645,385 B2 | 11/2003 | Krulik et al. | |
| 6,645,386 B1 | 11/2003 | Moreau et al. | |
| 6,685,834 B1 | 2/2004 | Murthy et al. | |
| 6,824,692 B2 | 11/2004 | Binot et al. | |
| 6,919,031 B2 | 7/2005 | Blumenschein et al. | |
| 6,966,989 B2 | 11/2005 | Hojsgaard et al. | |
| 6,966,993 B2 | 11/2005 | Binot | |
| 7,001,525 B2 | 2/2006 | Binot et al. | |
| 7,083,715 B2 | 8/2006 | Binot | |
| 7,101,482 B2 | 9/2006 | Chauzy et al. | |
| 7,147,778 B1 | 12/2006 | DiMassimo et al. | |
| 7,153,431 B2 | 12/2006 | Daugherty | |
| 7,172,701 B2 | 2/2007 | Gaid et al. | |
| 7,240,681 B2 | 7/2007 | Saik | |
| 7,244,361 B2 * | 7/2007 | Dwyer | B03D 3/06 |
| | | | 209/5 |
| 7,244,362 B2 | 7/2007 | Binot | |
| 7,311,841 B2 | 12/2007 | Binot et al. | |
| 7,317,193 B2 | 1/2008 | Girodet | |
| 7,323,108 B1 | 1/2008 | Garbett et al. | |
| 7,332,093 B2 | 2/2008 | Rosen et al. | |
| 7,407,582 B2 | 8/2008 | Sun | |
| 7,407,584 B2 | 8/2008 | Lemoine et al. | |
| 7,431,846 B2 * | 10/2008 | Palmer | 210/710 |
| 7,459,086 B2 | 12/2008 | Gaid | |
| 7,473,365 B2 | 1/2009 | Oger et al. | |
| 7,534,343 B2 | 5/2009 | Gomez et al. | |
| 7,578,416 B2 | 8/2009 | Underwood | |
| 7,641,800 B2 | 1/2010 | van Strien et al. | |
| 7,648,637 B1 | 1/2010 | Sauvignet et al. | |
| 7,648,638 B2 | 1/2010 | Essemiani et al. | |
| 7,678,278 B2 | 3/2010 | Binot et al. | |
| 7,683,354 B2 | 3/2010 | Girodet et al. | |
| 7,695,624 B2 | 4/2010 | Brockmann et al. | |
| 2001/0042721 A1 * | 11/2001 | Hodges et al. | 210/709 |
| 2004/0065613 A1 * | 4/2004 | Cadera et al. | 210/639 |
| 2005/0279711 A1 | 12/2005 | Goettert et al. | |
| 2007/0221580 A1 | 9/2007 | Lemoine et al. | |
| 2007/0278152 A1 * | 12/2007 | Musale | 210/636 |
| 2008/0035563 A1 | 2/2008 | Badard et al. | |
| 2008/0035577 A1 * | 2/2008 | Brook-Levinson et al. | 210/667 |
| 2008/0047903 A1 | 2/2008 | Morse | |
| 2008/0073271 A1 | 3/2008 | Cort | |
| 2008/0073278 A1 | 3/2008 | Cort | |
| 2008/0073283 A1 | 3/2008 | Cort | |
| 2008/0073284 A1 | 3/2008 | Cort | |
| 2008/0078721 A1 | 4/2008 | Binot et al. | |
| 2008/0121589 A1 | 5/2008 | Godlien | |
| 2008/0135478 A1 * | 6/2008 | Zuback | C02F 9/00 |
| | | | 210/638 |
| 2008/0217244 A1 | 9/2008 | Gaid | |
| 2008/0257810 A1 | 10/2008 | Sun | |
| 2008/0290029 A1 | 11/2008 | Croue et al. | |
| 2008/0290030 A1 | 11/2008 | Nagghappan et al. | |
| 2008/0296228 A1 | 12/2008 | Sauvignet et al. | |
| 2008/0314830 A1 | 12/2008 | Banerjee et al. | |
| 2009/0020458 A1 * | 1/2009 | Bozak et al. | 208/390 |
| 2009/0050570 A1 | 2/2009 | Sauvignet | |
| 2009/0127180 A1 | 5/2009 | Deskins | |
| 2009/0184061 A1 | 7/2009 | Maloum et al. | |
| 2009/0218281 A1 | 9/2009 | Sauvignet et al. | |
| 2009/0218300 A1 | 9/2009 | Essemiani et al. | |
| 2009/0236290 A1 | 9/2009 | Maloum et al. | |
| 2009/0250624 A1 | 10/2009 | Girodet et al. | |
| 2009/0255872 A1 | 10/2009 | Busnot et al. | |
| 2009/0261039 A1 | 10/2009 | Paillard et al. | |
| 2009/0261044 A1 | 10/2009 | Godlien et al. | |
| 2009/0294377 A1 | 12/2009 | Gallot | |
| 2009/0301948 A1 | 12/2009 | Essemiani et al. | |
| 2009/0301963 A1 | 12/2009 | Brockmann et al. | |
| 2009/0301974 A1 | 12/2009 | Belkhodja et al. | |
| 2009/0308815 A1 | 12/2009 | Sauvignet et al. | |
| 2010/0044286 A1 * | 2/2010 | Menju et al. | 210/96.1 |
| 2010/0065494 A1 | 3/2010 | Lemoine et al. | |
| 2010/0065497 A1 | 3/2010 | Daines-Martinez et al. | |
| 2010/0096335 A1 | 4/2010 | Sauvignet et al. | |
| 2010/0116753 A1 * | 5/2010 | Pruett et al. | 210/710 |
| 2010/0170854 A1 | 7/2010 | Casbeer et al. | |

* cited by examiner

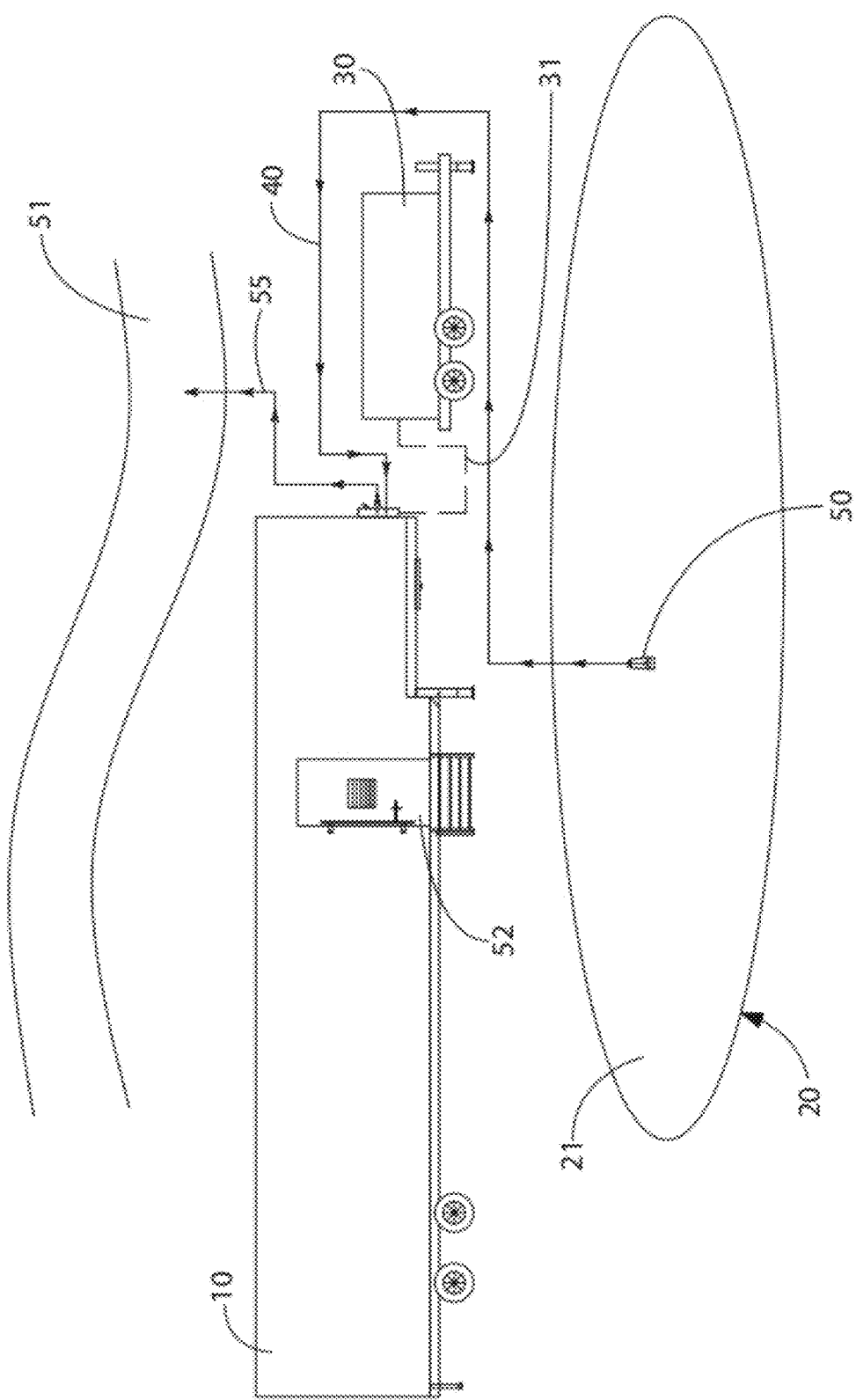

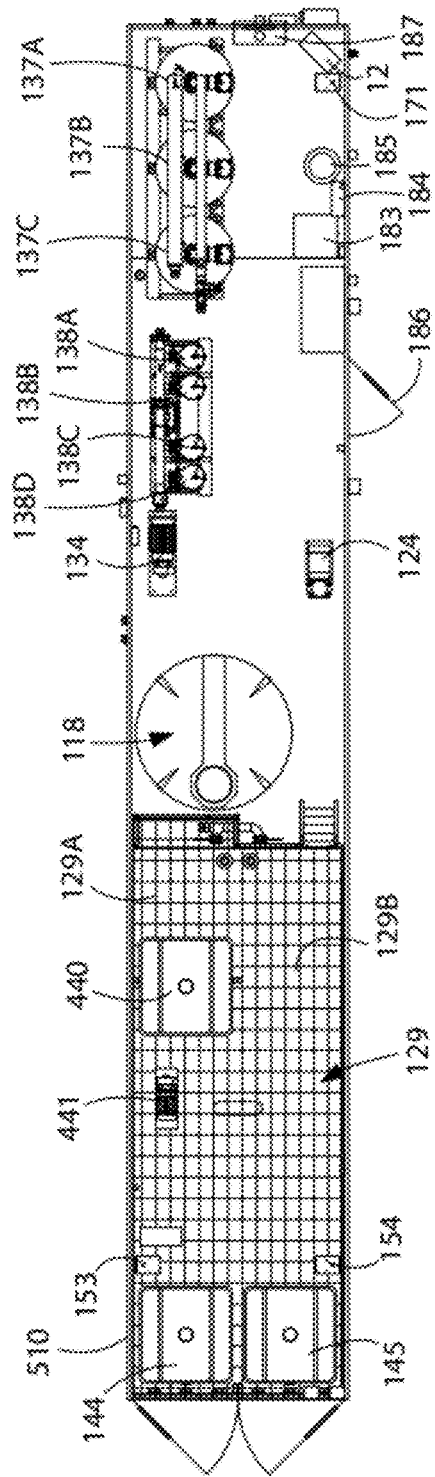
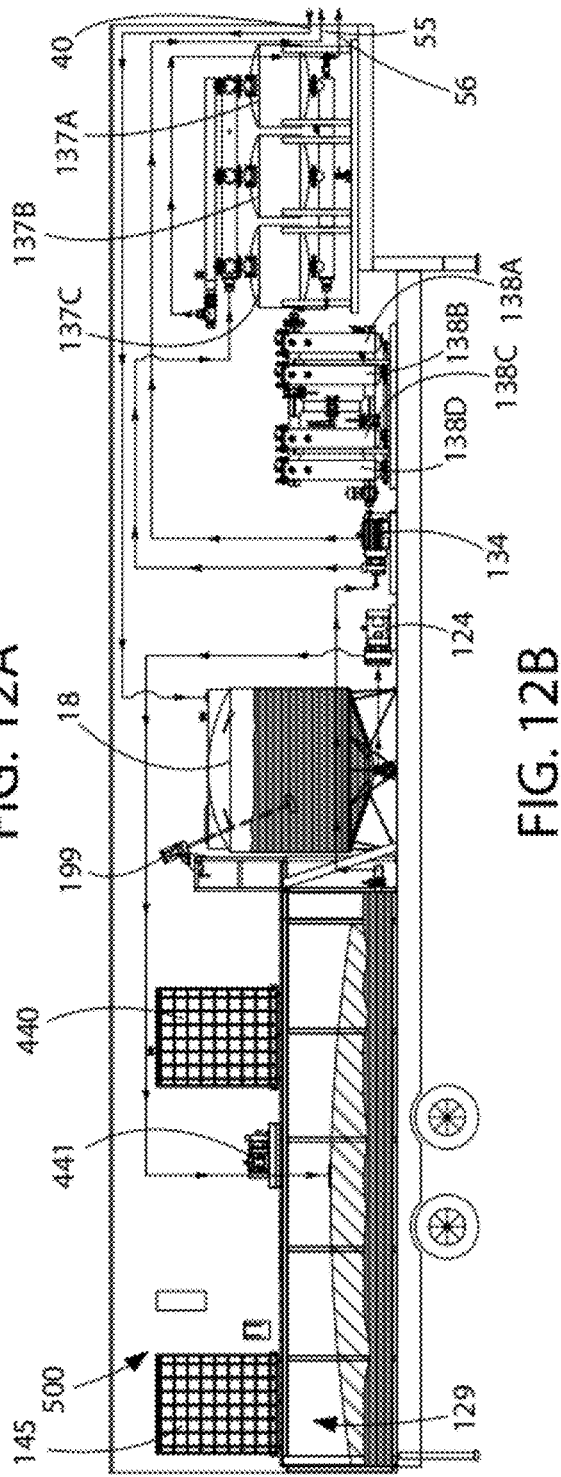
FIG. 12A
FIG. 12B

SYSTEM AND METHOD FOR THE TREATMENT OF WASTEWATER

CROSS-REFERENCE TO RELATED APPLICATIONS

This application claims priority to U.S. Provisional Patent Application Ser. No. 61/546,667, filed on Oct. 13, 2011 and U.S. Provisional Patent Application Ser. No. 61/485,964, filed on May 13, 2011, the entireties of which are hereby incorporated herein by reference.

FIELD OF THE INVENTION

The present invention relates generally to a system and method for the treatment of wastewater, and specifically to a system and method for removing suspended solids from wastewater.

BACKGROUND OF THE INVENTION

Construction sites, major industrial properties, riverbeds, caissons, mine shafts and the like have a tendency to collect wastewater. This wastewater must be removed to enable construction to take place on the construction site or cleaned to remove toxins and the like from riverbeds. The wastewater that collects in those locations contains dirt, soils and other solid particles. These solid particles create a high suspended solids level within the water. A standard way of measuring water quality for suspended solids is by turbidity readings as Nephelometric Turbidity Units (NTU). Water that is removed from a wastewater site must comply with specific discharge limitations prior to being discharged to surface water, such as a fresh water stream or river. Thus, water that is removed from a wastewater site must have a regulated minimum NTU level prior to discharge.

Oftentimes, wastewater also has a pH level that is either well above or well below accepted discharge limitations. Thus, wastewater must also be treated with pH adjustment chemicals in order to comply with the discharge limitations.

Previous systems and methods for reducing suspended solids in wastewater rely on gravity separation of solids within a clarifier. Gravity separation involves treating the wastewater with chemicals and then allowing the treated wastewater to sit in a tank until the suspended solids separate from the wastewater by gravity. These gravity separation systems typically require a minimum retention time of about 30 minutes even with enhanced solids separation techniques.

Thus, a need exists for a system and method for the treatment of wastewater that increases the speed at which the wastewater can be treated. Furthermore, a need also exists for a system and method for the treatment of wastewater that is fully automated. Further still, a need exists for a system and method for the treatment of wastewater that utilizes a minimum amount of chemicals to reduce pollutants and operating costs.

BRIEF SUMMARY OF THE INVENTION

These and other needs are met by the present invention, which is directed to a system and method for the treatment of wastewater. In one aspect, the invention can be a method of treating wastewater comprising: a) introducing wastewater having a first turbidity level into a wastewater treatment system; b) injecting an aqueous polymer mixture into the wastewater to flocculate suspended solids within the wastewater; c) removing the flocculated suspended solids from the wastewater to form a treated water having a second turbidity, the second turbidity being lower than the first turbidity; and wherein the aqueous polymer mixture of step b) is formed by introducing a raw polymer into a re-circulated portion of the treated water.

In another aspect the invention can be a method of treating wastewater comprising: a) introducing wastewater into a treatment line of a wastewater treatment system; b) injecting a first aqueous polymer mixture from a batch of the first aqueous polymer mixture that is stored in a tank into the treatment line to flocculate suspended solids within the wastewater; c) removing the flocculated suspended solids from the wastewater to form a treated water; d) monitoring a liquid level of the batch of the first aqueous polymer mixture in the tank; and e) upon the liquid level reaching a pre-determined lower threshold, forming an additional amount of the first aqueous polymer mixture and adding the additional amount of the first aqueous polymer mixture to the batch until the liquid level rises to a predetermined upper threshold.

In still another aspect, the invention can be a method of treating wastewater comprising: a) introducing wastewater into a treatment line of a wastewater treatment system; b) forming a batch of an aqueous polymer mixture in a tank, the batch having a maximum volume and the aqueous polymer mixture having a life cycle; c) injecting an aqueous polymer mixture from the batch into the treatment line at a flow rate to flocculate suspended solids within the wastewater; d) removing the flocculated suspended solids from the wastewater to form a treated water; and wherein the maximum volume is selected so that at least a single turnover of the batch is achieved within the life cycle of the aqueous polymer mixture.

In a still further aspect, the invention can be a method of treating wastewater comprising: a) introducing wastewater into a wastewater treatment system at a flow rate; b) measuring a turbidity level of the wastewater; c) injecting an aqueous polymer mixture into the wastewater at a flow rate to flocculate suspended solids within the wastewater; and wherein the flow rate of the aqueous polymer mixture injected into the wastewater in step c) is adjusted based on the measured turbidity level and the flow rate of the wastewater in step a).

In an even further aspect, the invention can be a method of treating wastewater comprising: a) flowing the wastewater along an axis; b) injecting a polymer into the wastewater at multiple injection points to flocculate suspended solids within the wastewater, the multiple injection points arranged in a circumferentially spaced apart manner about the axis; and c) removing the flocculated suspended solids from the wastewater to form a treated water.

The invention may, in yet another aspect, be a method of flocculating suspended solids from wastewater comprising: a) flowing the wastewater along an axis through a polymer injector, the polymer injector comprising a plurality of injector nozzles arranged in a circumferentially spaced apart manner about the axis; and b) injecting an aqueous polymer mixture into the wastewater via the plurality of injector nozzles.

In yet another aspect, the invention can be a system for treating wastewater comprising: a treatment line having an inlet for introducing wastewater into the system and an outlet for discharging treated water from the system; a first polymer injector operably coupled to the treatment line to introduce a first aqueous polymer mixture into the treatment line to flocculate suspended solids within the wastewater; a separator operably coupled to the treatment line downstream of the first polymer injector to remove the flocculated suspended solids from the wastewater to form the treated water; a recirculation line operably coupled to the treatment line downstream of the separator and to the first polymer injector, the recirculation line recirculating at least a portion of the treated water; and wherein the system is configured to form the first aqueous polymer mixture from the recirculated portion of the treated water and a first raw polymer.

In a further aspect, the invention can be a system for treating wastewater comprising: a treatment line having an inlet for introducing wastewater into the system and an outlet for discharging treated water from the system; a first tank containing a batch of a first aqueous polymer mixture; a first liquid level sensor operably coupled to the first tank to monitor a liquid level of the batch of the first aqueous polymer mixture; a first polymer injector operably coupled to the first tank and the treatment line to introduce the first aqueous polymer mixture into the treatment line to flocculate suspended solids within the wastewater; and the system configured to: (1) form an additional amount of the first aqueous polymer mixture and add the additional amount of the first aqueous polymer mixture to the batch of the first aqueous polymer mixture upon the first liquid level sensor detecting that the liquid level of the batch of the first aqueous polymer mixture is at a pre-determined lower threshold; and (2) cease formation and addition of the additional amount of the first aqueous polymer mixture to the batch of the first aqueous polymer mixture upon the first liquid level sensor detecting that the liquid level of the batch of the first aqueous polymer mixture is at a pre-determined upper threshold.

In another aspect, the invention can be a system for treating wastewater comprising: a treatment line having an inlet for introducing wastewater into the system and an outlet for discharging treated water from the system; a first polymer tank containing a batch of a first aqueous polymer mixture, the batch having a maximum volume and the first aqueous polymer mixture having a life cycle; a first polymer injector operably coupled to the first polymer tank and the treatment line, the first polymer injector configured to introduce the first aqueous polymer mixture into the treatment line to flocculate suspended solids within the wastewater; and the system configured to achieve at least a single turnover of the maximum volume of the batch within the life cycle of the aqueous polymer mixture.

The invention may also, in another aspect, be a system for treating wastewater comprising: a treatment line having an inlet for introducing wastewater into the system at a flow rate and an outlet for discharging treated water from the system; a turbidity sensor operably coupled to the treatment line to measure a turbidity level of the wastewater; a first polymer injector operably coupled to the treatment line downstream of the turbidity sensor to introduce a first aqueous polymer mixture into the treatment line at a flow rate; and the system configured to automatically adjust the flow rate of the first aqueous polymer mixture injected into the treatment line based on the measured turbidity level and the flow rate of the wastewater.

In still another aspect, the invention can be a system for flocculating suspended solids in wastewater comprising: a conduit through which wastewater flows along an axis; a plurality of nozzles operably coupled to a source of a first polymer; and the plurality of nozzles arranged in a circumferentially spaced apart manner about the axis, the plurality of nozzles operably coupled to the conduit to inject the first polymer into the wastewater flowing through the conduit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side view of a trailer housing a wastewater treatment system according to a first embodiment of the present invention;

FIG. 12A is a top view of the wastewater treatment system housed within the trailer of FIG. 11;

FIG. 12B is a driver side view of the wastewater treatment system housed within the trailer of FIG. 11 illustrating the process flow;

DETAILED DESCRIPTION OF THE INVENTION

Figure 2A:
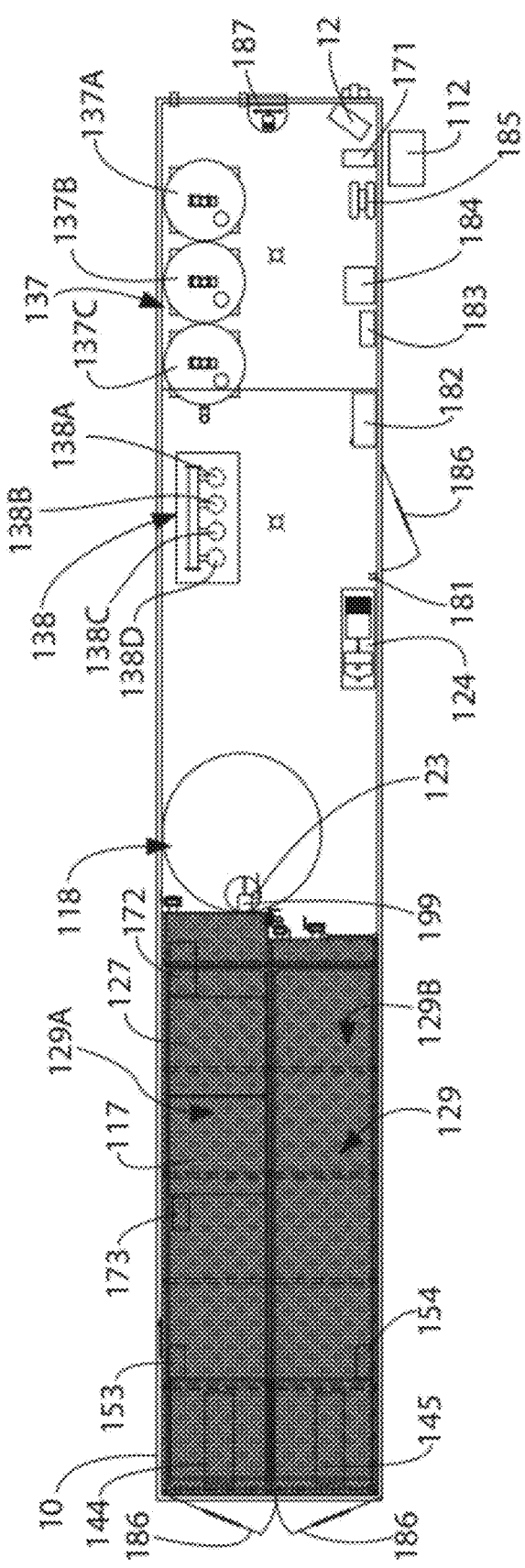
FIG. 2A is a top view of the wastewater treatment system housed within the trailer of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2B:
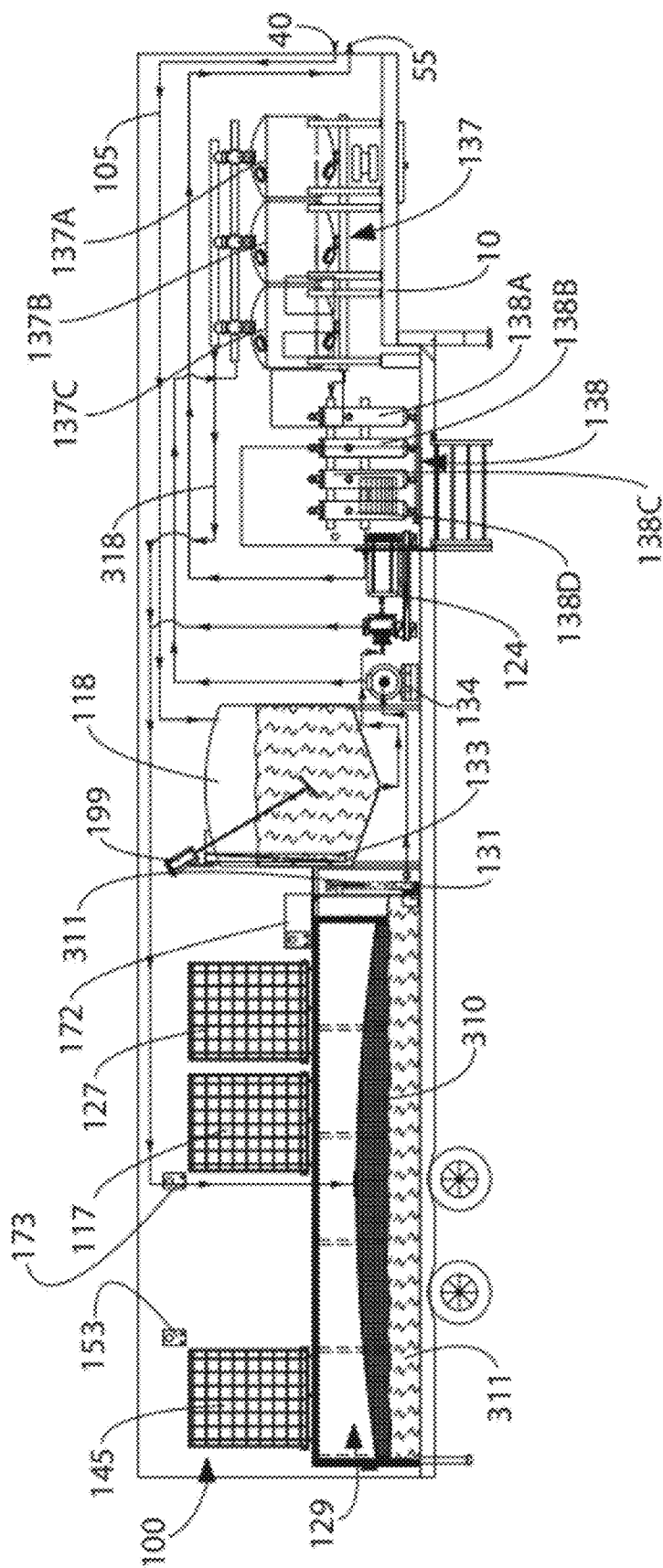
FIG. 2B is a side view of the wastewater treatment system housed within the trailer of FIG. 1.

Referring first to FIG. 1-2B, a trailer 10 for containing a wastewater treatment system 100 therein is illustrated. Thus, the present invention relates to a wastewater treatment system 100 that is housed within the trailer 10. Of course, in other embodiments the invention may merely be the wastewater treatment system 100 without being housed within the trailer 10. However, mounting the wastewater treatment system 100 within the trailer 10 is desirable in certain embodiments because it facilitates movement of the wastewater treatment system 100 from site to site.

The trailer 10 is any type of housing that is large enough to contain the wastewater treatment system 100 therein and that is portable, or capable of being moved from one location to another. In one embodiment, the trailer 10 is fifty-three feet long, eight feet wide and thirteen feet high. Of course, the invention is not limited by the size of the trailer 10 in all embodiments. The trailer 10 can be connected to a truck, tractor or other motorized vehicle for transporting the trailer 10 to individual work sites. However, the invention is not so limited and in other embodiments the trailer 10 may itself contain a motor so that the trailer 10 can be driven by itself without the assistance of or attachment to a truck or other motorized vehicle. Thus, the trailer 10 may be any housing that has wheels for easy transportability or that can be easily mounted on another wheeled and motored vehicle for purposes of transporting the trailer 10 to a desired location.

In the exemplified embodiment, the trailer 10 is a fully enclosed and insulated trailer. The trailer 10 is fully equipped with heating equipment, such as a heater 12, in order to maintain the interior of the trailer 10 at a suitable working temperature for the wastewater treatment system 100 housed therein. There are times that the trailer 10 will need to be transported to a location with very low temperatures. In order to ensure that the low temperature in the external environment will not adversely affect the ability of the wastewater treatment system 100 housed within the trailer 10 to properly treat wastewater, the interior of the trailer 10 is heated. Additionally, in certain embodiments the trailer 10 is equipped with a fan 187 to cool the interior of the trailer 10 when it is operating in a high-temperature-location. The fan 187 or other cooling component can also be used if a foul odor is found in the system 100. Moreover, the trailer 10 is insulated to reduce the amount of noise that escapes the trailer 10 when the wastewater treatment system 100 is fully operating and to prevent extreme external temperatures (cold and hot) from entering into the interior of the trailer 10.

The trailer 10 is transported to a desired location for use of the wastewater treatment system 100 housed therein. Of course, it should be understood that, in embodiments where the invention is the wastewater treatment system 100 without the trailer 10, the wastewater treatment system 100 can be built on-site or transported to the site, without the trailer 10. In the exemplified embodiment, the trailer 10 is located adjacent to a water source 20 that is filled with wastewater 21. In certain embodiments, the water source 20 is a pond that has collected wastewater that requires treatment prior to being transported or introduced into a river, stream, ocean or other water body. In some embodiments, the water source 20 may be located at a construction site, a mine shaft, a caisson or the like. However, in other embodiments the water source 20 may be an entire river bed that contains an amount of wastewater that needs to be treated. Thus, the water source 20 need not be a pond in all embodiments but can be any location that has wastewater that needs treatment for discharge into a stream or other desired location. Furthermore, in some instances a lake or river may become contaminated and the water contained therein may need to be treated. In such instances, the wastewater can be treated by the wastewater treatment system 100 housed within the trailer 10 and then discharged back into the same lake or river from which it was removed or to another location.

In some embodiments, the trailer 10 is operably connected to a generator 30 by an electrical line 31. In certain embodiments, the generator is a three-phase generator, but the invention is not to be so limited in all embodiments. The generator 30 provides electrical power to the wastewater treatment system 100 housed within the trailer 10. Of course, in certain embodiments the generator 30 may be omitted and the trailer 10 may contain an integral power system for powering the wastewater treatment system 100.

Although not illustrated, the outside of the trailer 10 may contain lights to allow illumination around the trailer 10 during evening hours. The outside of the trailer 10 will also contain operation indication lights (not illustrated). The operation indication lights are a three-light system whereby each of the lights is a different color. Alternatively, the operation indication lights may be a single light that is capable of lighting up in multiple colors. For example, the operation indication lights may light up green to indicate that the system housed within the trailer 10 is in good operating condition, orange to indicate that the system is operating but requires maintenance, and red to indicate that a system alarm has occurred thereby causing the system to shut down. The operation indication lights enable the system 100 housed within the trailer 10 to be operated unmanned. Thus, persons external to the trailer 10 can be informed of the operating condition of the system 100 without needing to go into the trailer 10.

The trailer 10 comprises a door 52 that provides entry into the trailer 10. Thus, an operator can enter into the interior of the trailer 10 to perform maintenance on the wastewater treatment system 100 as desired. For example, if the operation indication light is orange, an operator will be informed that maintenance is required and the operator will enter the trailer 10 through the door 52 to perform such maintenance.

The trailer 10 also comprises a light switch 181, a control panel 182, a circuit breaker box 183, a transformer 184 and an air compressor 185. The light switch 181 illuminates the interior of the trailer 10 and the control panel 182 enables a user to provide instructions to the system 100. Thus, the control panel 182 is operably coupled to a controller (discussed in detail below) and a user can input data, algorithms, threshold information, instructions and the like into the controller so that the controller can control operation of the system 100 as desired. Moreover, the trailer 10 is equipped with several vents 186 to vent the interior of the trailer 10 as desired.

The following description describes components that are connected to the wastewater treatment system 100 that is housed within the trailer 10. Thus, it should be understood that in embodiments wherein the trailer 10 is omitted, the components described below merely form a part of the wastewater treatment system 100. An influent line 40 extends from the wastewater treatment system 100 housed within the trailer 10 to the water source 20. The influent line 40 is a fluid line within which the wastewater flows from the water source 20 into the wastewater treatment system 100 housed within the trailer 10. Thus, the influent line 40 extends between the wastewater treatment system 100 and the water source 20.

The wastewater is removed from the water source 20 and introduced into the wastewater treatment system 100 by a wastewater introduction pump 50. In one embodiment, the wastewater introduction pump 50 is a 300 gallon per minute dewatering pump, such as a Godwin GSP80-HV 8 Hp dewatering pump. Of course, the invention is not to be limited by the particular type of pump used in the system. Moreover, the invention is not limited to use of a pump for introducing the wastewater into the system 100 and in other embodiments the wastewater may be introduced into the wastewater treatment system 100 by other means, such as gravity. Furthermore, in still other embodiments the 100 system can take on any feed process where the source water can maintain a minimum of 15 psi and maximum of 75 psi influent feed.

The wastewater treatment system 100 comprises an effluent line 55 that extends from the trailer 10 to a desired location. In the exemplified embodiment, the desired location is a fresh water stream 51. However, the invention is not so limited in all, embodiments and the effluent line 55 can extend to any location where it is desired to introduce water that has been treated by the wastewater treatment system 100. Thus, the effluent line 55 takes the wastewater post-treatment by the wastewater treatment system 100 and delivers it to any desired location. Because the treated water is cleaned to the extent required by local regulations in order to discharge the treated water to a fresh water stream (or other desired location), the treated water is able to be discharged at any desired location.

Figure 3:
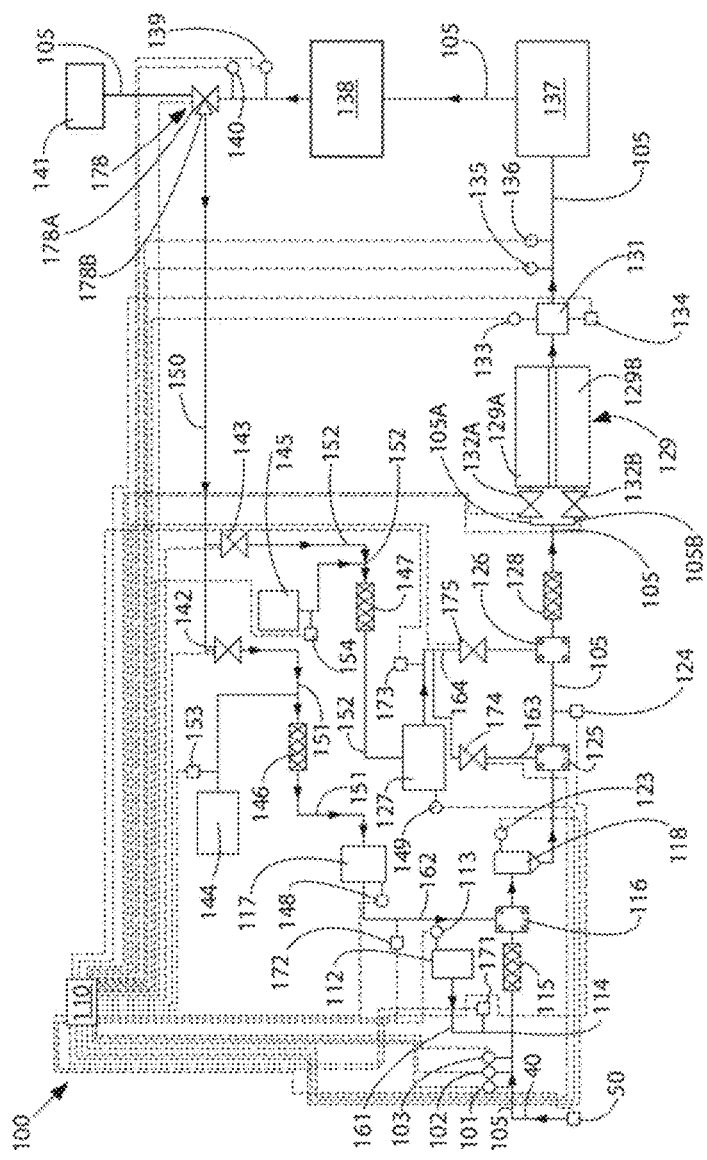
FIG. 3 is a schematic diagram of a wastewater treatment system in accordance with an embodiment of the present invention.

Referring now to FIGS. 2A-3 concurrently, the wastewater treatment system 100 will be described in more detail. The wastewater treatment system 100 comprises a treatment line 105 that is fluidly coupled to the influent line 40 and through which the wastewater flows throughout the treatment process. In certain embodiments, the treatment line 105 is integral with the influent line 40 and the influent line 40 is merely a portion of the treatment line 105 that is external to the trailer 10. In other embodiments, the influent line 40 can be a separate pipe line that is operably coupled to the treatment line 105. The treatment line 105 has an inlet for introducing the wastewater into the wastewater treatment system 100.

Various holding tanks, pumps, valves, mixers and injection ports are operably and/or fluidly coupled to the treatment line 105 to treat the wastewater and form treated water having desired turbidity and pH characteristics. In certain embodiments, the treatment line 105 includes all of the piping, conduits, tanks, sensors, valves, mixers, ports, pumps and other components such that the treatment line 105 includes the entire fluid path from inlet to outlet through which the wastewater flows during treatment. Thus, if it is described herein that a certain treatment is taking place in the treatment line 105, that treatment may be taking place within a conduit, tank, valve, mixer, port or the like that is connected to the treatment line 105. Each of the various components of the wastewater treatment system 100 will be described herein below along with a description of the treatment process.

Upon entering into the wastewater treatment system 100, the wastewater is introduced into the treatment line 105 of the wastewater treatment system 100. The wastewater flows along and within the treatment line 105 in the direction of the arrows. After entering into the treatment line 105, the incoming wastewater passes through a turbidity sensor 101 and a pH sensor 102. The turbidity sensor 101 is operably coupled to the treatment line 105 and is configured to measure a turbidity level of the wastewater. The pH sensor 102 is operably coupled to the treatment line 105 and is configured to measure the pH level of the wastewater. In the exemplified embodiment, the pH sensor 102 is positioned downstream of the turbidity sensor 101. However, the invention is not to be so limited in all embodiments and the turbidity sensor 101 can be positioned downstream of the pH sensor 102 in other embodiments. Because the wastewater has not been treated in any manner at this stage, the turbidity sensor 101 and the pH sensor 102 measure the pH and turbidity levels, respectively, of the wastewater prior to treatment.

Furthermore, each of the turbidity sensor 101 and the pH sensor 102 is operably coupled to a controller 110 as described in detail below with reference to FIG. 7. For purposes of clarity, it should be understood that in FIG. 3 operable coupling between the controller 110 and the various components to which the controller 110 is connected is illustrated with dotted/dashed lines and the treatment line 105 and other plumbing/pipe lines are illustrated in solid lines. Operable coupling between the various sensors, valves and other components of the system to the controller 110 may be achieved by hard-wire connection or any of the various known wireless technologies such as Bluetooth, infrared, Wi-Fi, radio frequency (RF), microwave, or the like.

The pH sensor 102 measures the pH level of the incoming wastewater from zero to fourteen, with a pH level of zero being extremely acidic, a pH level of fourteen being extremely basic and a pH level of seven being neutral (i.e., neither acidic nor basic). The turbidity sensor 101 measures the cloudiness or haziness of the incoming wastewater in terms of Nephelometric Turbidity Units (hereinafter, "NTU"). As discussed herein, the wastewater treatment system 100 treats the incoming wastewater so as to bring the pH level and the turbidity level of the incoming wastewater into compliance with regulated discharge limitations prior to discharging the wastewater to the desired location, such as a fresh water stream. In one embodiment, prior to discharge, the wastewater is treated within the wastewater treatment system 100 so that the pH achieves a level of between 6 and 9 and the turbidity achieves a level of less than 50 NTU. Of course, it should be understood that regulated discharge limitations vary depending upon the location at which the wastewater is desired to be discharged to and local regulations. Therefore, pH and turbidity levels outside of the above-noted ranges may be acceptable in certain circumstances. The system 100 can be adjusted to create a final product of treated water that has any desired pH level and turbidity level.

In certain embodiments, the incoming wastewater also passes through a flow rate sensor 103 that is operably coupled to the treatment line 105 and that measures the flow rate of the incoming wastewater. In such embodiments, the flow rate sensor 103 may also be operably coupled to the controller 110. However, in other embodiments the flow rate sensor 103 is omitted because the flow rate of the incoming wastewater is known based on the operation of the wastewater introduction pump 50. As will be understood from the description below, the pH measurement and the flow rate of the incoming wastewater cause the wastewater treatment system 100 to automatically adjust an amount of a pH adjustment chemical that is added to the wastewater. Similarly, the flow rate of the incoming wastewater and the turbidity measurement cause the wastewater treatment system 100 to automatically adjust an amount of a polymer that is added to the wastewater. Thus, the flow rate sensor 103 may be included in the system 100 to ensure that the flow rate of the incoming wastewater is in compliance with the anticipated flow rate based on the wastewater introduction pump 50 operation.

Figure 7:
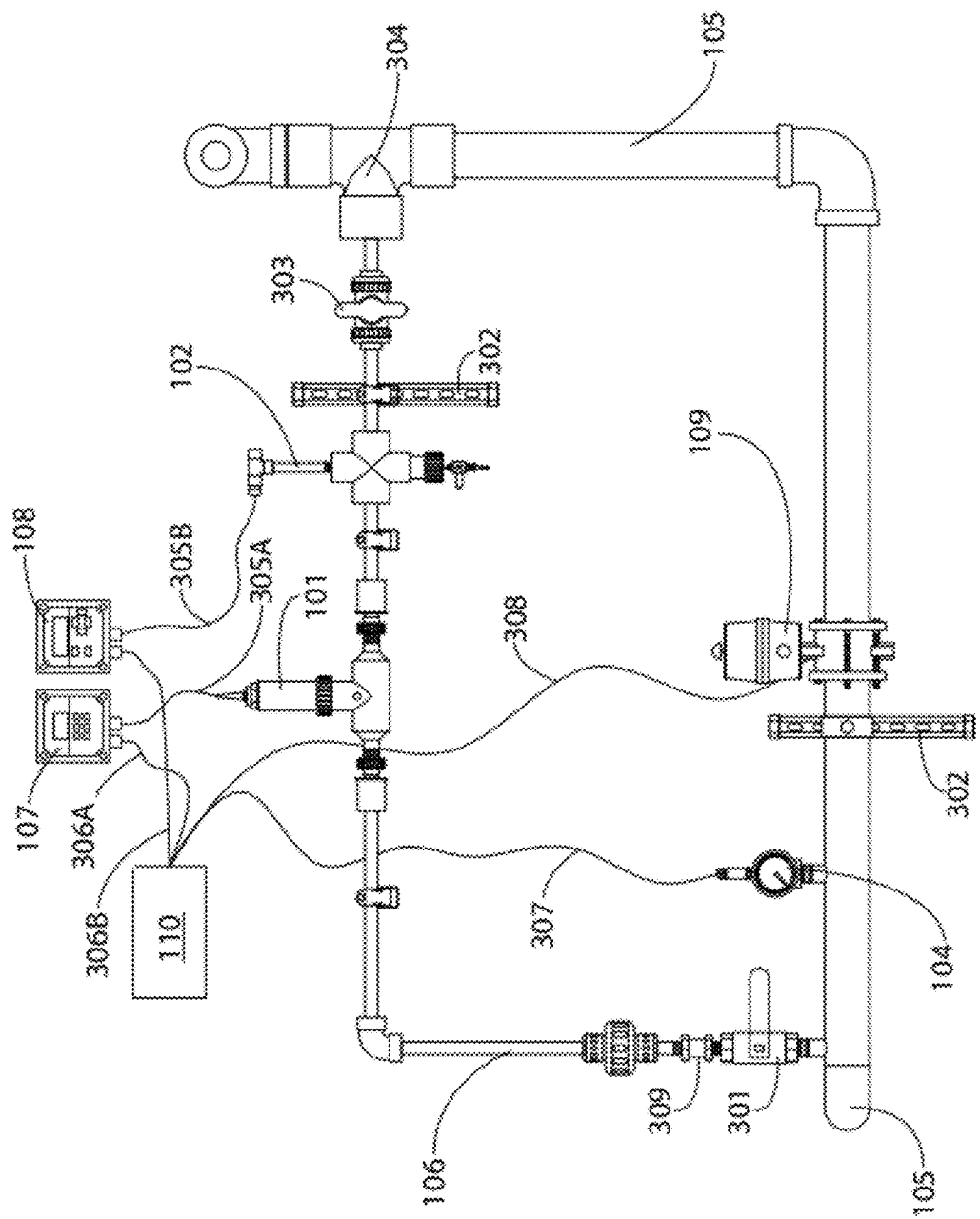
FIG. 7 is a schematic of a turbidity and pH monitoring system in accordance with a first embodiment of the present invention.
Figure 8A:
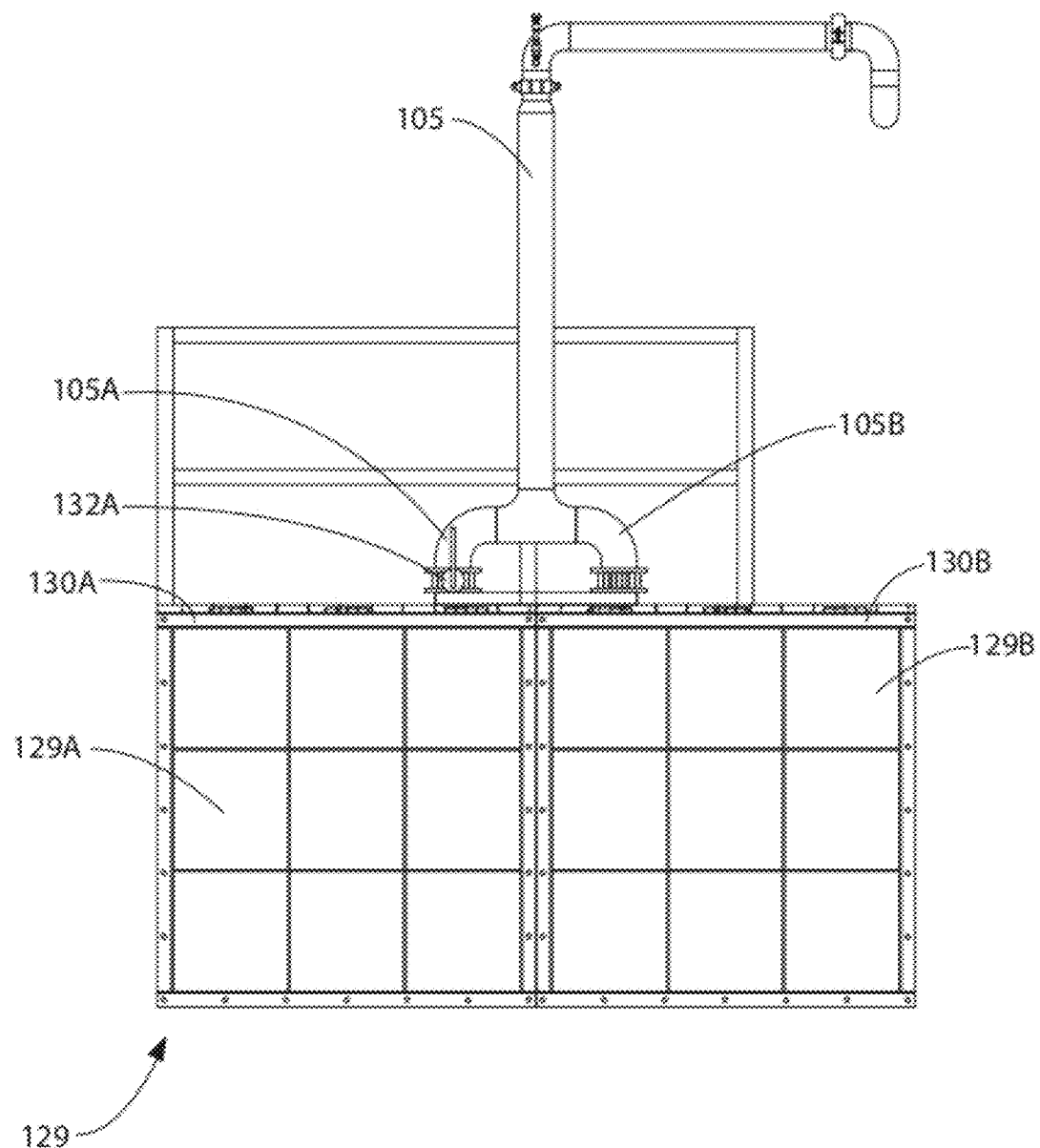
FIG. 8A is a front view of a separator in accordance with an embodiment of the present invention.
Figure 8B:
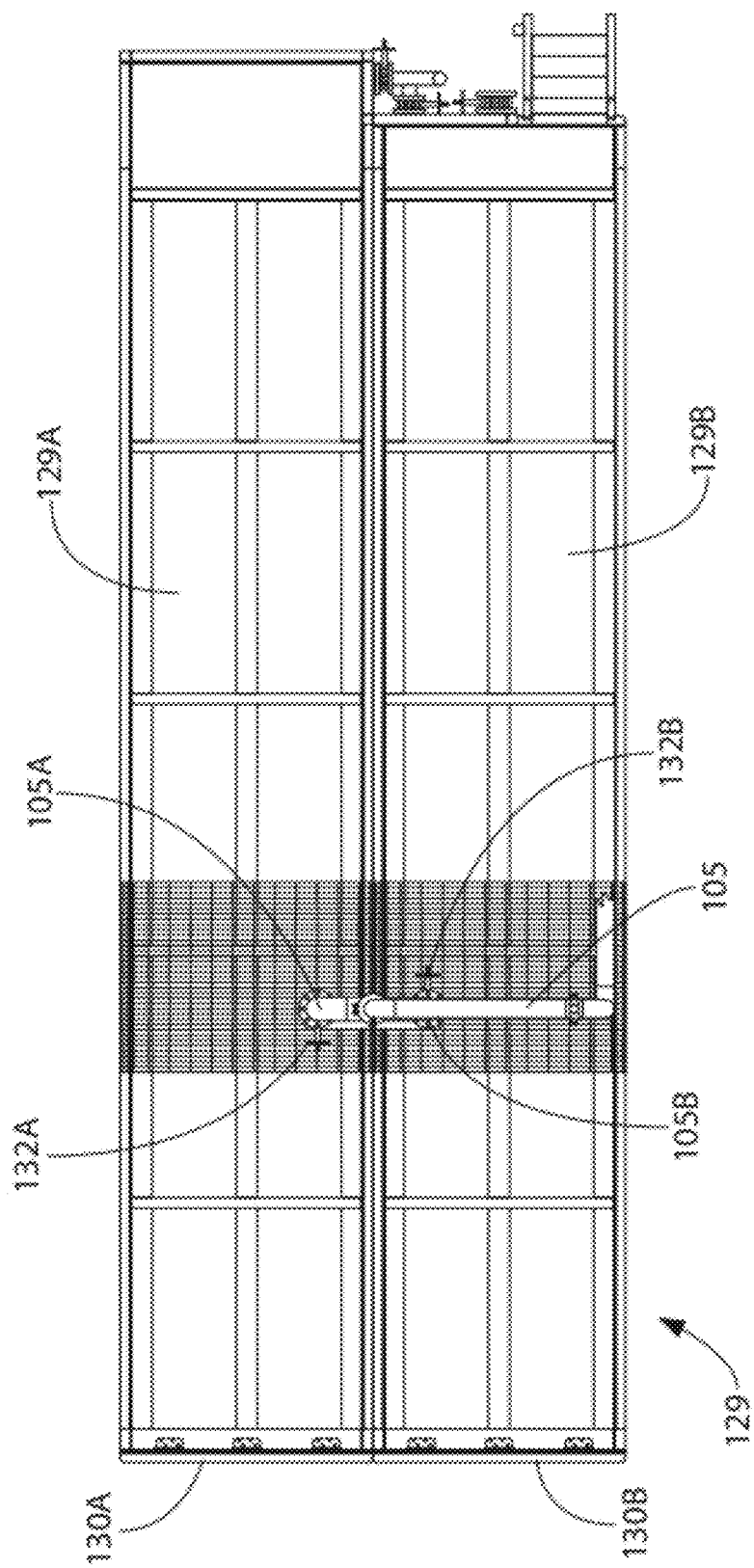
FIG. 8B is a top view of the separator of FIG. 8A.

Turning to FIG. 7, one exemplified structural embodiment of the turbidity and pH sensors 101, 102 as they are operably coupled to and incorporated into the wastewater treatment system 100 is illustrated. It should be understood that the turbidity and pH sensors 101, 102 can be operably connected to the wastewater treatment system 100 in manners other than those illustrated in FIG. 7 and still achieve the same purpose as that described hereinafter below. Specifically, the invention is not limited to the exact structural arrangement of the components illustrated in FIG. 7 in all embodiments.

The incoming wastewater flows into the treatment line 105 of the wastewater treatment system 100 as described above. In the exemplified embodiment, a portion of the wastewater continues to flow through the treatment line 105 (which is the main flow line of the wastewater treatment system 100) while another portion of the wastewater flows through a sensor flow line 106 for testing by the pH and turbidity sensors 101, 102. Flow of the wastewater into the sensor flow line 106 is controlled by a ball valve 301 and a dole valve 309. In the exemplified embodiment, the ball valve 301 is threadily coupled to the sensor flow line 106 and formed of brass. However, the invention is not to be so limited in all embodiments and the ball valve 301 may be coupled to the sensor flow line 106 by other methods and may be formed of materials other than brass. Moreover, the valve 301 may not be a ball valve, but may instead be another type of valve, such as a butterfly valve, a check valve, a diaphragm valve, a gate valve, a piston valve, a plug valve or the like. The ball valve 301 can be operably coupled to the controller 110 for automatic control of the opening/closing of the ball valve 301 or the ball valve 301 may be controlled manually by a user.

When the ball valve 301 is in an open position, a portion of the wastewater will flow into and through the sensor flow line 106. After passing through the ball valve 301, the wastewater will flow through the dole valve 309. The dole valve 309 is a restriction in the piping that ensures that the wastewater flows through the sensor flow line 106 at a constant flow rate. The dole valve 309 has the appearance of a normal pipe coupling, but comprises an internal orifice that restricts the gallons per minute that can flow through the dole valve 309. In certain preferable embodiments, the constant flow rate is approximately five gallons per minute, although in other embodiments the constant flow rate can be between 0-20 gallons per minute or 5-15 gallons per minute. The flow rate of the wastewater through the sensor flow line 106 is specifically calculated to ensure that the turbidity and pH sensors 101, 102 can adequately and accurately measure the turbidity and pH of the wastewater.

The pH and turbidity sensors 101, 102 are operably coupled to the sensor flow line 106. It should be understood that the invention is not so limited and in certain embodiments the sensor flow line 106 is omitted altogether and the pH and turbidity sensors 101, 102 can be operably coupled directly to the treatment line 105. Thus, as used herein, operable coupling of the pH and turbidity sensors 101, 102 to the treatment line 105 can be a direct operable coupling or an indirect operable coupling via the sensor flow line 106.

The system 100 is provided with a plurality of strut channels 302 for mounting or otherwise affixing the wastewater treatment system 100 to a wall or other structure (such as the interior of the trailer 10). Thus, the strut channels 302 provide light structural support for the wiring, plumbing and/or mechanical components of the wastewater treatment system 100. In the exemplified embodiment, the strut channels 302 are 1⅝"×1⅝," various length, painted galvanized steel or aluminum mounts. However, the invention is not to be so limited in all embodiments. Moreover, in the exemplified embodiment the strut channels 302 are Unistrut® strut channels, but the strut channels can be Kindorf®, SuperStrut®, Strut®, Metstrut® or the like in other embodiments.

The downstream-most portion of the sensor flow line 106 comprises a true union ball valve 303 that controls the flow of the wastewater as it exits the sensor flow line 106 and re-enters the treatment line 105. The sensor flow line 106 is connected to the treatment line 105 at a three-way tee 304 formed of polyvinyl chloride ("PVC") piping.

In the exemplified embodiment, the treatment line 105 is a three-inch diameter pipe through which the wastewater flows throughout the wastewater treatment system 100. Of course, the invention is not so limited and the diameter of the treatment line 105 can be more or less than three-inches in other embodiments. Furthermore, the treatment line 105 can be made of a stainless steel or other hard steel material, or it can formed of PVC, or a combination of stainless steel and PVC as desired throughout the wastewater treatment system 100. The sensor flow line 106 is a one-inch diameter pipe, but can be larger or smaller than one-inch in other embodiments. The sensor flow line 106 is also formed of a steel or PVC material. Of course, the invention is not limited to the particular materials used for the flow lines 105, 106 in all embodiments and the use of other appropriate materials is within the scope of the present invention.

In the exemplified embodiment, the portion of the wastewater that flows through the sensor flow line 106 passes through the turbidity sensor 101 and the pH sensor 102. The turbidity sensor 101 is operably coupled to a turbidity transmitter 107 by a wire 305A and the pH sensor 102 is operably coupled to a pH transmitter 108 by a wire 305B. In the exemplified embodiment, the operable coupling is accomplished via an electrical wire. However, other methods of coupling the components described above may be utilized as desired to achieve the same function, such as a wireless (infrared, radio frequency, Bluetooth, etc.) communication. Each of the turbidity transmitter 107 and the pH transmitter 108 is an LCD display that displays the measured turbidity and pH readings of the wastewater. Furthermore, the turbidity transmitter 107 is operably coupled to the controller 110 by a wire 306A and the pH transmitter 108 is operably coupled to the controller 110 by a wire 306B.

The controller 110 is a computer-based programmable logic controller or processor, which can be a suitable microprocessor, personal computer, or the like for process control. The controller 110 is configured to control/automate all aspects of the wastewater treatment system 100 described herein. The controller 110 may include various input/output ports used to provide connections to the various components of the wastewater treatment system 100 that need to be controlled and/or communicated with. As noted above, the electrical and/or communication connections are indicated in dotted lines in FIG. 3. The controller 110 also comprises sufficient memory to store algorithms and process recipes and other data, such as various upper and lower thresholds that are pre-programmed by an operator. The controller 110 can communicate with the various components of the wastewater treatment system 100 to automatically adjust process conditions such as flow rates of the various chemicals that are injected into the wastewater for treatment thereof, batch sizes of the various chemical mixtures, refill procedures and the like. The type of system controller used for any given system will depend on the exact needs of the system in which it is incorporated.

In one aspect the controller 110 receives signals regarding the turbidity and pH of the wastewater and adjusts the amount and types of chemicals that are injected into the wastewater automatically in response to the turbidity and pH measurements. In certain embodiments, the controller 110 is a Windows-based system that allows remote or local site access and control of the system via a telephone line or a cellular phone connection through a laptop or desktop computer. In this manner, all components, including all motors, valves, pumps, sensors and switches of the wastewater treatment system 100 can controlled by the controller 110. Moreover, operation of the components referenced above can be displayed for user review (such as on the control panel 182 exemplified in FIG. 2A). This also enables an operator to access real-time and historical data for tracking fault conditions, pressure histories; hour meters for the motors and liquid flow rates for total flow analysis. The controller 110 can provide routine faxes and status reports and provide notification when the system shuts down due to a fault condition or otherwise. For example, notification of system shut down can be made by virtue of the controller 110 illuminating the red light on the outside of the trailer 10 as described above.

Still referring to FIG. 7, due to its operable coupling to the controller 110 and to the turbidity sensor 101, the turbidity transmitter 107 will receive turbidity measurements of the incoming wastewater from the turbidity sensor 101 and transmit that data to the controller 110 for further processing. Similarly, due to its operable coupling to the controller 110 and to the pH sensor 102, the pH transmitter 108 will receive pH measurements of the incoming wastewater from the pH sensor 102 and transmit that data to the controller 110 for further processing. In this manner, the controller 110 can self-regulate the wastewater treatment system 100 and ensure proper treatment of the wastewater to achieve desired discharge water characteristics (i.e., discharge turbidity and pH levels).

A pressure gauge/transmitter 104 and an automated valve actuator 109 are operably coupled to the treatment line 105. The controller 110 is operably coupled to the pressure gauge/transmitter 104 by a wire 307 and to the automated valve actuator 109 by a wire 308. The controller 110 can automatically operate (i.e., open/close) the valve actuator 109 (which may be an electrical actuator that has an input for accepting a 4-20 mA signal and outputs a 4-20 mA signal) in order to control the flow rate of the wastewater through the treatment line 105.

After passing through the turbidity sensor 101 and the pH sensor 102, the wastewater in the sensor flow line 106 is re-introduced into the treatment line 105 via the three-way tee 304. The wastewater in the treatment line 105 then continues to flow through the wastewater treatment system 100 towards a first polymer injector 116 as described below.

Referring again to FIGS. 2A-3 concurrently, the wastewater treatment system 100 will be further described. After passing through the turbidity and pH sensors 101, 102, and optionally through the flow rate sensor 103, the wastewater continues to flow through the treatment line 105. As noted above, the pH sensor 102 will measure the pH of the wastewater and transmit pH data to the controller 110 via the pH transmitter 108. Using the transmitted pH data and preprogrammed algorithms, the controller 110 will adjust a flow rate of a pH adjustment chemical that is added to the wastewater as described below.

A pH adjustment chemical tank 112 is fluidly and operably coupled to the treatment line 105 by a pH adjustment chemical injection line 161. Specifically, the pH adjustment chemical tank 112 is coupled to the treatment line 105 by the pH adjustment chemical injection line 161 at a pH adjustment chemical injector 114 that is positioned along the treatment line 105 downstream of the pH sensor 102. In certain embodiments, the pH adjustment chemical injector 114 may be a nozzle that injects a pH adjustment chemical into the treatment line 105 or merely an opening in the treatment line 105 for the introduction of the pH adjustment chemical. Of course the invention is not to be so limited and in other embodiments the pH adjustment chemical injector 114 can be a single injection point prior to a mixer 115 discussed below.

The pH adjustment chemical tank 112 contains a pH adjustment chemical that can adjust the pH level of the wastewater. Thus, if the pH sensor 102 detects that the pH of the wastewater is below a desired level, the pH adjustment chemical will be added to increase the pH of the wastewater. Examples of pH adjustment chemicals that can be used to increase the pH of the wastewater include Sodium Hydroxide, Sodium Carbonate, Potassium Hydroxide, or other similar mineral caustic chemicals. Alternatively, if the pH sensor 102 detects that the pH of the wastewater is above a desired level, the pH adjustment chemical will be added to decrease the pH of the wastewater. Examples of pH adjustment chemicals that can be used to decrease the pH of the wastewater include Hydrochloric acid, Sulfuric Acid, or other mineral acids. Finally, if the pH sensor 102 detects that the pH of the wastewater is at the desired level, no pH adjustment chemical will be added to the wastewater. In certain embodiments, the pH adjustment chemical tank 112 may include more than one tank to achieve a desired pH level of the wastewater by adding different pH adjustment chemicals to either increase or decrease the pH of the wastewater. In such an embodiment, a first tank can contain a pH adjustment chemical for lowering the pH level of the wastewater and a second tank can contain a pH adjustment chemical for raising the pH level of the wastewater. In certain embodiments the pH injection system is a variable rate system such that a greater amount of the pH chemical can flow into the wastewater by speeding up the flow of the pH chemical. However, the invention is not to be so limited and in other embodiments the pH chemical injection system is a steady rate system.

The pH adjustment chemical tank 112 is operably coupled to a pH liquid level sensor 113. The pH liquid level sensor 113 detects the liquid level of the pH adjustment chemical contained within the pH adjustment chemical tank 112. In this manner, an operator can be made aware if the liquid level of the pH adjustment chemical contained within the pH adjustment chemical tank 112 drops below a pre-determined threshold such that the pH adjustment chemical tank 112 must be refilled. Alternatively or additionally, in certain embodiments the pH liquid level sensor 113 can be operably coupled to the controller 110 in order to automate refilling of the pH adjustment chemical tank 112.

As noted above, the pH adjustment chemical is injected into the treatment line 105 (and into the wastewater) at the pH adjustment chemical injector 114, which is positioned along the treatment line 105 downstream of the pH sensor 102. The flow rate at which the pH adjustment chemical is injected into the wastewater is automatically adjusted by the controller 110 based on the pH level as measured by the pH sensor 102 and transmitted to the controller 110 and the known or measured flow rate of the wastewater due to algorithms and processing techniques that are pre-stored in the memory of the controller 110. The pH adjustment chemical is drawn from the pH adjustment chemical tank 112 by a pump 171 and injected into the incoming wastewater in the treatment line 105 at the pH adjustment chemical injector 114. The invention is not limited to use of the pump 171 for drawing the pH adjustment chemical from the pH adjustment chemical tank 112 and injecting the pH adjustment chemical into the treatment line 105. In other embodiments, the pump 171 may be replaced by a valve that is opened and closed as desired in order to inject the pH adjustment chemical into the treatment line 105 (and hence, also into the wastewater) at a desired flow rate.

The controller 110 is operably coupled to the pump 171 (and/or any valves that are used in place of the pump 171). As such, the controller 110 controls the speed with which the pump 171 draws the pH adjustment chemical from the pH adjustment chemical tank 112 in order to control the flow rate of the pH adjustment chemical that is introduced into the treatment line 105 and added to the wastewater. Thus, as the measured pH level (as measured by the pH sensor 102) and flow rate of the incoming wastewater changes over time, the flow rate at which the pH adjustment chemical is introduced or injected into the wastewater in the treatment line 105 can be increased and/or decreased in order to accommodate the changes in pH level and flow rate.

Because the controller 110 is operably coupled to the pH sensor 101 (either directly or via the pH transmitter 108), the controller 110 can process information regarding the pH of the incoming wastewater and adjust the flow rate at which the pH adjustment chemical is added to the wastewater accordingly. This automatic adjustment of the flow rate at which the pH adjustment chemical is injected into the wastewater in the treatment line 105 ensures the pH level of the wastewater complies with discharge limitations upon discharge from the wastewater treatment system 100. Moreover, the automatic adjustment of the flow rate at which the pH adjustment chemical is injected into the wastewater in the treatment line 105 occurs during operation of the wastewater treatment system 100. Thus, changes to the dose (i.e., flow rate) of the pH adjustment chemical can be made to ensure that the wastewater receives proper chemical treatment to meet discharge limitations without temporarily suspending operation of the wastewater treatment system 100.

After the pH adjustment chemical is injected into the wastewater, the wastewater passes through a mixer 115 that is operably coupled to the treatment line 105. In the exemplified embodiment, the mixer 115 is an in-line mixer that is positioned along the treatment line 105. Thus, the mixer 115 has the same pipe diameter as the treatment line 105. Of course, the invention is not to be so limited and in other embodiments the mixer 115 can be a separate mixing tank that is not in-line with the treatment line 105. Thus, the mixer 115 can be any type of mechanism that is capable of mixing the wastewater with the pH adjustment chemical. The mixer 115 thoroughly mixes the pH adjustment chemical into the wastewater to bring the pH level of the wastewater into compliance with discharge limitations. The mixer 115 may mix the pH adjustment chemical and the wastewater by forcing the wastewater to flow in a cross-flow configuration, such as by the use of baffles. Alternatively, the mixer 115 may mix the pH adjustment chemical and the wastewater with a propeller or other stirring/mixing mechanism or structure.

Downstream of the mixer 115, the treatment line 105 comprises a first polymer injector 116 operably coupled thereto. The first polymer injector 116 injects a polymer (i.e., a first aqueous polymer mixture) into the treatment line 105 at a plurality of points or locations along the treatment line 105, simultaneously. As used herein, the wastewater treatment system 100 is described wherein chemicals are injected into the treatment line 105. It should be understood that when these chemicals are injected into the treatment line 105, they are also injected into the wastewater, which is flowing through the treatment line 105.

In the exemplified embodiment, the first polymer injector 116 injects the polymer into the treatment line 105 at four points or locations along the treatment line 105 simultaneously. However, the invention is not to be so limited and in other embodiments the first polymer injector 116 may be a two-point, three-point, five-point, six-point or more injector that injects the polymer into the treatment line 105 at any number of a plurality of points or locations simultaneously. Thus, the invention is not limited by the specific number of points or locations along the treatment line 105 that the first polymer injector 116 injects the polymer in all embodiments.

The first polymer injector 116 is operably coupled to a first polymer tank 117 by a first polymer injection line 162. The first polymer tank 117 contains a first aqueous polymer mixture. The first aqueous polymer mixture is a mixture of a first raw polymer and water. As discussed below, the water in the first aqueous polymer mixture is feedback wastewater (i.e., treated water) that has passed through and been treated by the wastewater treatment system 100 and re-circulated back through the wastewater treatment system 100. Thus, the invention is described herein with the first polymer injector 116 injecting a first aqueous polymer mixture into the treatment line 105, the first aqueous polymer mixture being a dilute polymer/water mixture. However, it should be understood that in certain embodiments, the first polymer injector 116 may inject a pure or raw polymer into the treatment line 105.

The first polymer tank 117 is also operably coupled to a liquid level sensor 148 that monitors the liquid level of the first aqueous polymer mixture within the first polymer tank 117. The liquid level sensor 148 is operably coupled to the controller 110, which enables the controller 110 to automatically control refilling of the first polymer tank 117. Thus, the liquid level sensor 148 ensures that the first polymer tank 117 contains a desired amount of the first aqueous polymer mixture and enables the wastewater treatment system 100, via instructions provided by the controller 110, to automatically refill the first polymer tank 117 with the first aqueous polymer mixture when the first polymer tank 117 becomes empty (or the liquid level of the first aqueous polymer mixture goes below a pre-determined lower threshold). The formation of the first aqueous polymer mixture and the process of refilling the first polymer tank 117 with the first aqueous polymer mixture will be described in greater detail below with reference to FIGS. 3 and 6.

Figure 4A:
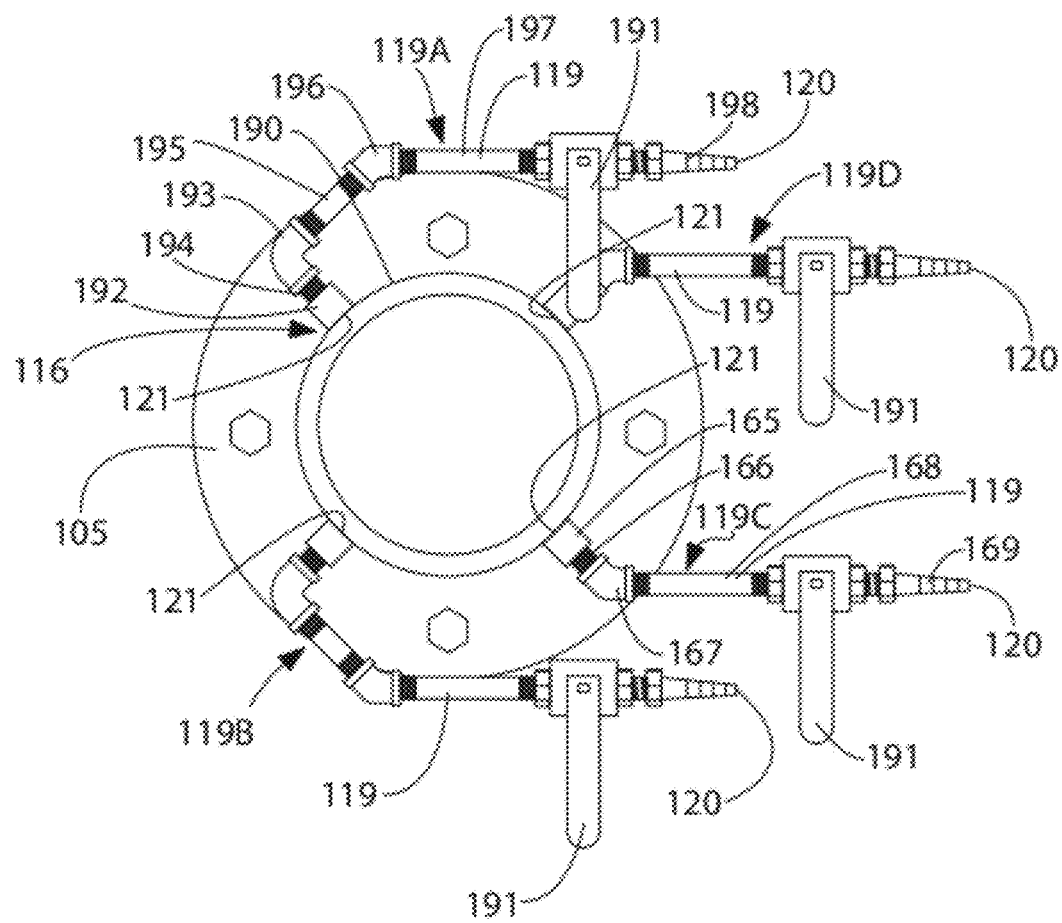
FIG. 4A is a top view of a polymer injector in accordance with a first embodiment of the present invention.
Figure 4B:
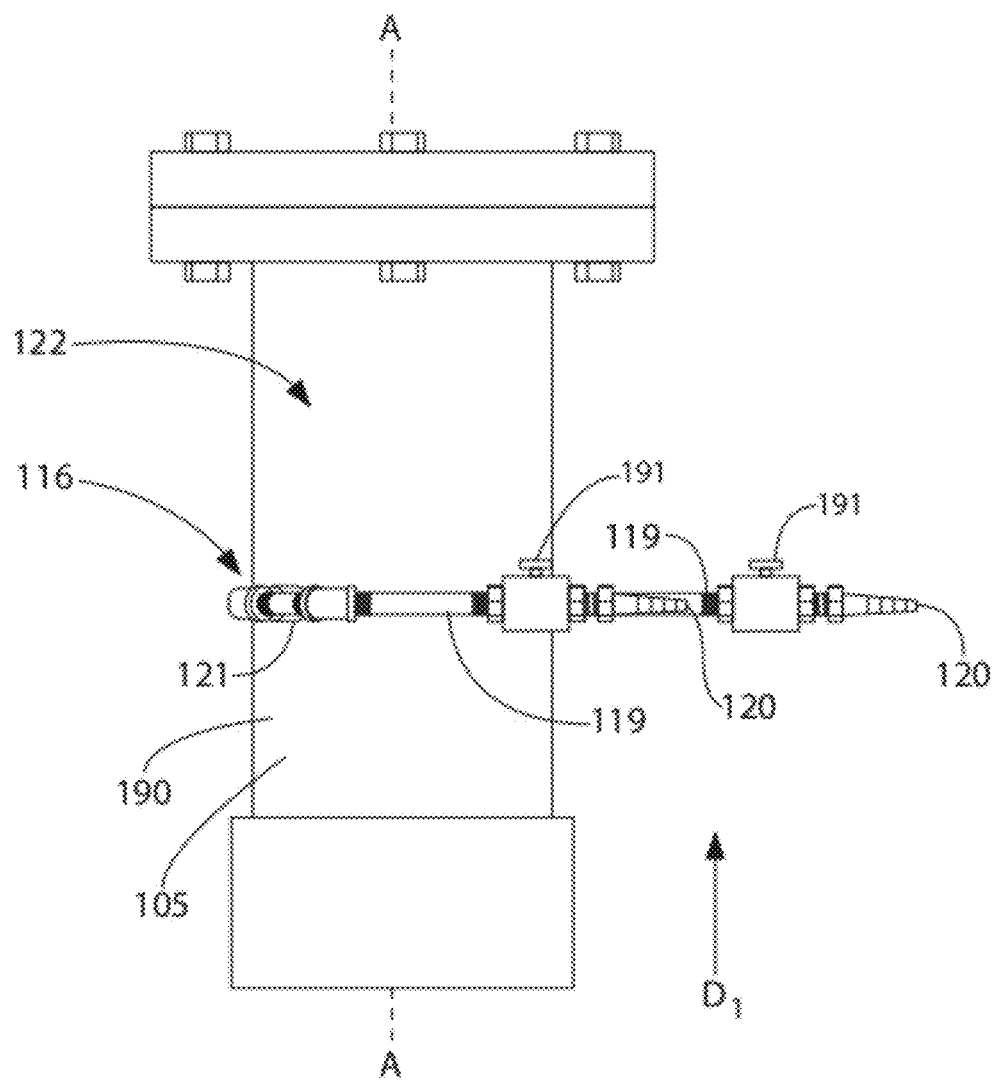
FIG. 4B is a side view of the polymer injector of FIG. 4A.

Referring to FIGS. 3-4B concurrently, as noted above the first aqueous polymer mixture is injected into the treatment line 105 at a plurality of points or locations along the treatment line 105 simultaneously. The plurality of points are located within close proximity to one another such that the first aqueous polymer mixture is injected into the treatment line 105 at a conduit 190, but at multiple points or locations within that conduit 190. In the exemplified embodiment, the conduit 190 is a portion of the treatment line 105 that is located in between the mixer 115 and a first polymer mixer 118. In certain embodiments, the first polymer mixer 118 is a tank, although the invention is not to be so limited in all embodiments. As will be described in more detail below, the first polymer mixer 118 mixes the first aqueous polymer mixture with the wastewater after the first aqueous polymer mixture is injected into the treatment line 105 (and, hence, into the wastewater).

The conduit 190 may merely be a portion of the treatment line 105, or the conduit 190 may be a separate component that is operably coupled to the treatment line 105. The conduit 190, and hence also the treatment line 105, has an axis A-A. In the exemplified embodiment, the wastewater flows through the conduit 190 and the treatment line 105 along the axis A-A in the direction indicated by the arrow $D_1$. Although in the exemplified embodiment the axis of flow of the wastewater is congruent with the axis A-A of the conduit 190 and treatment line 105, in certain other embodiments the axis of flow of the wastewater may be different than the axis A-A. The structural details of various embodiments of the first polymer injector 116 will be described in more detail below with reference to FIGS. 4A-5B.

The first polymer injector 116 injects the first aqueous polymer mixture into the treatment line 105 at multiple points simultaneously. Thus, the first polymer injector 116 enables the first aqueous polymer mixture that is injected into the treatment line 105 to be diluted while still enabling the benefits of the polymer to be imparted to the wastewater. Injecting a polymer into wastewater facilitates flocculation of the solids that are suspended within the wastewater. Thus, the polymer promotes flocculation of solids that are suspended within the wastewater by causing the suspended solids to aggregate and form a floc. The floc, which is a build-up of the suspended solids, can then be more easily separated from the wastewater as will be described in more detail below.

By using the first polymer injector 116 and injecting the first aqueous polymer mixture into the wastewater at multiple points simultaneously, the present invention enables the polymer to be diluted, which minimizes the amount of polymer chemicals that are required to achieve the desired results. Furthermore, adding a diluted polymer (i.e., the first aqueous polymer mixture) to the wastewater and injecting the first aqueous polymer mixture at multiple locations simultaneously induces better mixing with the wastewater for enhanced floc generation. Of course, as described above the polymer does not need to be diluted in all embodiments and in certain other embodiments a pure polymer can be injected into the treatment line 105 via the first polymer injector 116.

Referring now to FIGS. 4A and 4B concurrently, one embodiment of the first polymer injector 116 located along the treatment line 105 will be described. As discussed above, the first polymer injector 116 is located at the conduit 190 that is operably coupled to the treatment line 105. In the exemplified embodiment, the conduit 190 is a narrowed portion of the treatment line 105. The invention is not to be so limited and in other embodiments the conduit 190 can be a widening of the treatment line 105 or the conduit 190 can be in-line with and have the same cross-sectional shape and diameter as the treatment line 105. Thus, in certain embodiments the treatment line 105 forms the conduit 190 and the conduit 190 is not a separate component. The wastewater flows along the treatment line 105 (and the conduit 190) in the direction of the arrow $D_1$, which is along the axis A-A of the treatment line 105 (and the conduit 190). The first polymer injector 116 includes four injection nozzles 119. Each of the injection nozzles 119 has a first end 120 that is operably and fluidly coupled to the first polymer tank 117 (either directly or indirectly via the first polymer injection line 162) and a second end 121 that is operably and fluidly coupled to the conduit 190.

Figure 14:
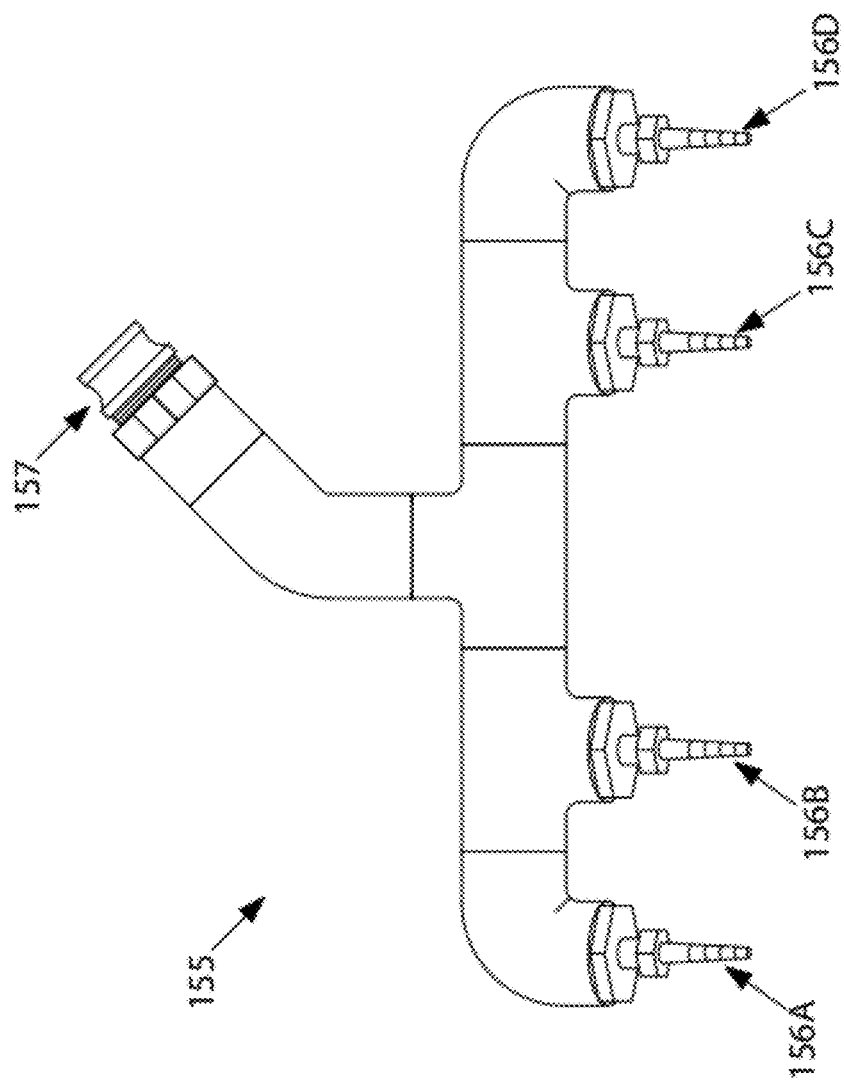
FIG. 14 is an isometric view of a header that supplies an aqueous polymer to the polymer injectors of FIGS. 4A-5B.

Referring briefly to FIG. 14, more specifically the first end 120 of the injection nozzles 119 are operably and fluidly coupled to a header 155. The header 155 comprises four nozzles 156A-156D that are operably coupled to the first end 120 of the injection nozzles 119 of the polymer injector 116. Furthermore, the header 155 also comprises a connector 157 that is operably and fluidly coupled to the first polymer injection line 162. Thus, the aqueous polymer mixture flows into the connector 157 of the header 155, through the header 155, and out of each of the nozzles 156A-156D of the header 155. Each one of the nozzles 156A-156D of the header 155 is operably coupled to one of the four injection nozzles 119 of the polymer injector. The connection between the nozzles 156A-156D and the nozzles 119 can be achieved via a hose, piping, conduit or the like.

Referring again to FIGS. 4A and 4B, each of the injection nozzles 119 comprises an adjustable valve 191. When the adjustable valves 191 are open, the first aqueous polymer mixture flows from the first polymer tank 117, through the injection nozzles 119 and into the conduit 190 of the treatment line 105. When the adjustable valves 191 are closed, the first aqueous polymer mixture is prohibited from flowing through the injection nozzles 119. The adjustable valves 191 can be opened completely to enable a greater amount of the first aqueous polymer mixture to flow through the injection nozzles 119 and into the conduit 190 of the treatment line 105 or partially to enable less of the first aqueous polymer mixture to flow through the injection nozzles 119 and into the conduit 190 of the treatment line 105.

Each of the adjustable valves 191 is operably coupled to the controller 110. Thus, the opening (partially or completely) and closing of the adjustable valves 191 and the degree to which the adjustable valves 191 are opened and/or closed is automatically regulated by the controller 110 as will be described in more detail below. In this manner, the controller 110 can control the amount or flow rate of the first aqueous polymer mixture that is injected into the wastewater via the first polymer injector 116. In addition to the adjustable valves 191, the amount of the first aqueous polymer mixture that flows through the injection nozzles 119 can also (or alternatively) be controlled by a pump 172 that is operably coupled to the first polymer tank 117 and to the controller 110 (see FIG. 3). In certain embodiments, the pump 172 can be replaced by a valve.

In the embodiment illustrated in FIGS. 4A and 4B, the conduit 190 is a pipe having a circular cross-sectional shape and an outer surface 122. Of course, the invention is not to be so limited in all embodiments and the conduit 190 can take on other shapes as desired. The second ends 121 of the injection nozzles 119 of the first polymer injector 116 are positioned around and coupled to the outer surface 122 of the conduit 190 (and hence also positioned about the axis of the conduit 190) in a circumferentially spaced-apart manner. More specifically, in the exemplified embodiment the second ends 121 of the injection nozzles 119 are located within a single plane that is substantially transverse to the direction of flow $D_1$ of the wastewater through the treatment line 105 (and also to the axis A-A of the conduit 190). Thus, the first aqueous polymer mixture is injected into the wastewater at a plurality of points that are longitudinally aligned along the direction of flow $D_1$. As noted above, the first aqueous polymer mixture is injected from each of the four injection nozzles 119 simultaneously.

In the exemplified embodiment, the injection nozzles 119 comprise a first nozzle 119A, a second nozzle 119B, a third nozzle 119C and a fourth nozzle 119D. The first and second nozzles 119A, 119B have an identical structure and the third and fourth nozzles 119C, 119D have an identical structure. The structure will be described in detail below with reference to the first nozzle 119A and the third nozzle 119C, but it should be understood that the structures described below are equally applicable to the second nozzle 119B and the fourth nozzle 119D, respectively. Thus, in the exemplified embodiment, the first nozzle 119A has the same structural arrangement as the second nozzle 119B and the third nozzle 119C has the same structural arrangement as the fourth nozzle 119D.

In the exemplified embodiment, the injection nozzles 119 are arranged in a circumferentially equi-spaced apart manner about the axis A-A of the conduit 190. More specifically, each of the nozzles 119A-D is positioned 90° away from each adjacent one of the nozzles 119A-D. Such an arrangement provides a uniform dispersion of the first aqueous polymer mixture into the wastewater as the first aqueous polymer mixture is injected into the wastewater. However, the invention is not so limited and in other embodiments the injection nozzles 119 can be arranged so that they are not equi-spaced about the axis of the conduit 190.

In the exemplified embodiment, all components of the first nozzle 119A are formed from a stainless steel. Moreover, in the exemplified embodiment, all of the components of the first nozzle 119A also comprise a one-quarter inch national pipe thread (NPT). However, the invention is not to be so limited in all embodiments and materials other than stainless steel and NPT other than one-quarter inch can be used.

The first nozzle 119A is operably connected to the conduit 190 by a coupler 192. The coupler 192 is connected to a first elbow 193 by a first threaded connector pipe 194. Thus, the first threaded connector pipe 194 is threadily connected to each of the coupler 192 and the first elbow 193. In the exemplified embodiment, the first elbow 193 is a 90° elbow pipe that changes the direction of the first nozzle 119A by 90°. A second threaded connector pipe 195 extends between and is threadily coupled to the first elbow 193 and a second elbow 196. In the exemplified embodiment, the second elbow 196 is a 45° elbow pipe that changes the direction of the first nozzle 119A by 45°. A third threaded connector pipe 197 extends between and is threadily coupled to the second elbow 196 and the adjustable valve 191. In certain embodiments, the adjustable valve 191 is a full port or full bore ball valve formed of brass. Of course, in other embodiments the adjustable valve 191 can be other than a ball valve and formed of materials other than brass as desired. Finally, a tapered compression fitting 198 is coupled to the adjustable valve 191. The compression fitting 198 comprises the first end 120 of the first nozzle 119A and is therefore operably and fluidly coupled to the first polymer tank 117.

Turning to the third nozzle 119C (and hence also the fourth nozzle 119D), all components of the third nozzle 119C are formed from a stainless steel. Moreover, all of the components of the third nozzle 119C also comprise a one-quarter inch national pipe thread (NPT). However, the invention is not to be so limited in all embodiments and materials other than stainless steel and NPT other than one-quarter inch can be used.

The third nozzle 119C is operably connected to the conduit 190 by a coupler 165. The coupler 165 is connected to a first elbow 166 by a first threaded connector pipe 167. Thus, the first threaded connector pipe 167 is threadily connected to each of the coupler 165 and the first elbow 166. In the exemplified embodiment, the first elbow 166 is a 45° elbow pipe that changes the direction of the third nozzle 119C by 45°. A second threaded connector pipe 168 extends between and is threadily coupled to the first elbow 166 and the adjustable valve 191. In certain embodiments, the adjustable valve 191 is a full port or full bore ball valve formed of brass. Of course, in other embodiments the adjustable valve 191 can be other than a ball valve and formed of materials other than brass as desired. Finally, a tapered compression fitting 169 is coupled to the adjustable valve 191. The compression fitting 169 comprises the first end 120 of the third nozzle 119C and is therefore operably and fluidly coupled to the first polymer tank 117.

The connections between the various components of the nozzles 119A-D is described above as being a threaded connection. However, it should be understood that the invention is not to be so limited in all embodiments and in certain other embodiments the various components of the nozzles 119A-D can be connected by adhesives, welding or the like. Because the first and second nozzles 119A, 119B have both a 90° elbow and a 45° elbow and the third and fourth nozzles 119C, 119D have only a 45° elbow, the first ends 120 of each of the nozzles 119A-D are located on the same side of the conduit 190.

Figure 5A:
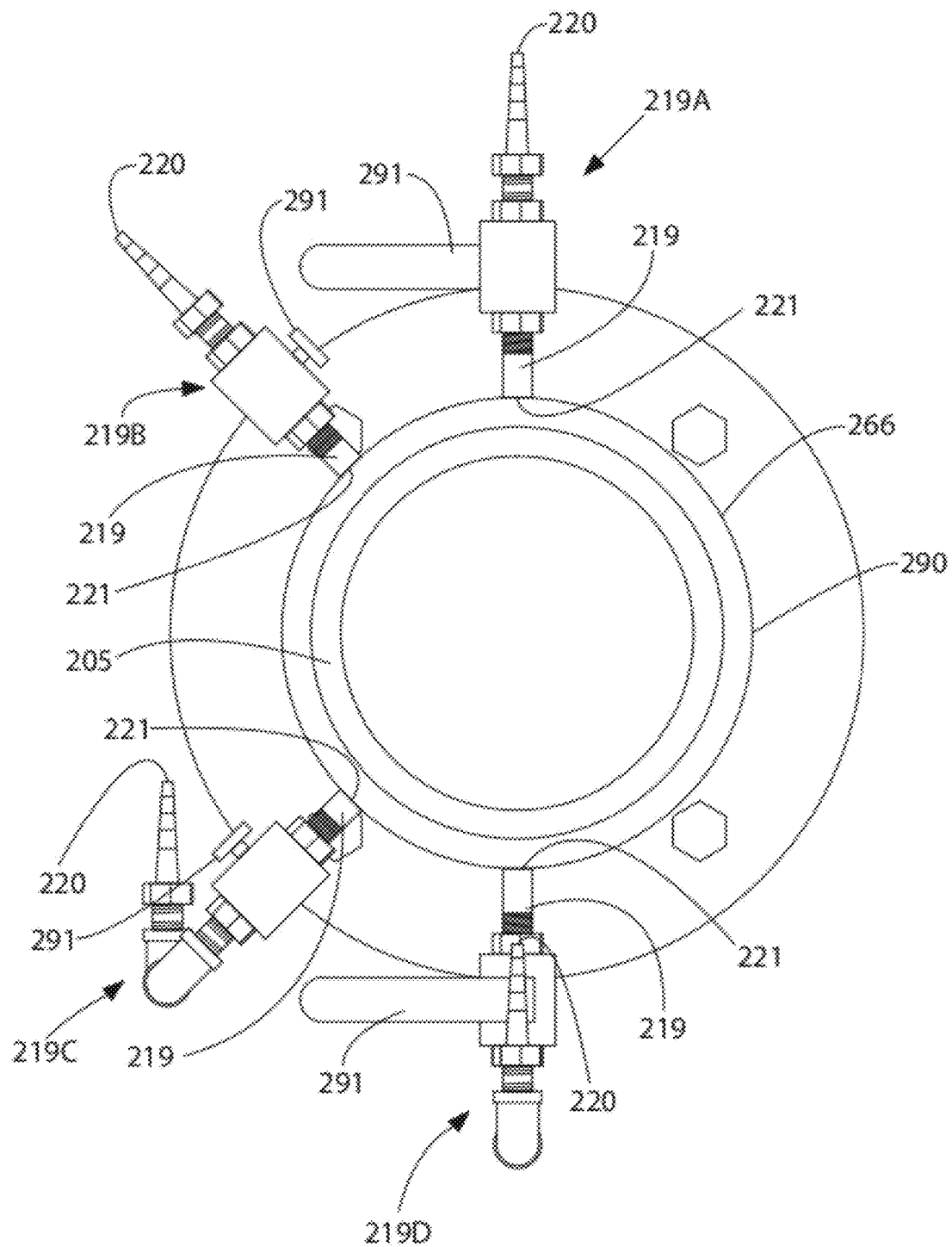
FIG. 5A is a top view of a polymer injector in accordance with a second embodiment of the present invention.
Figure 5B:
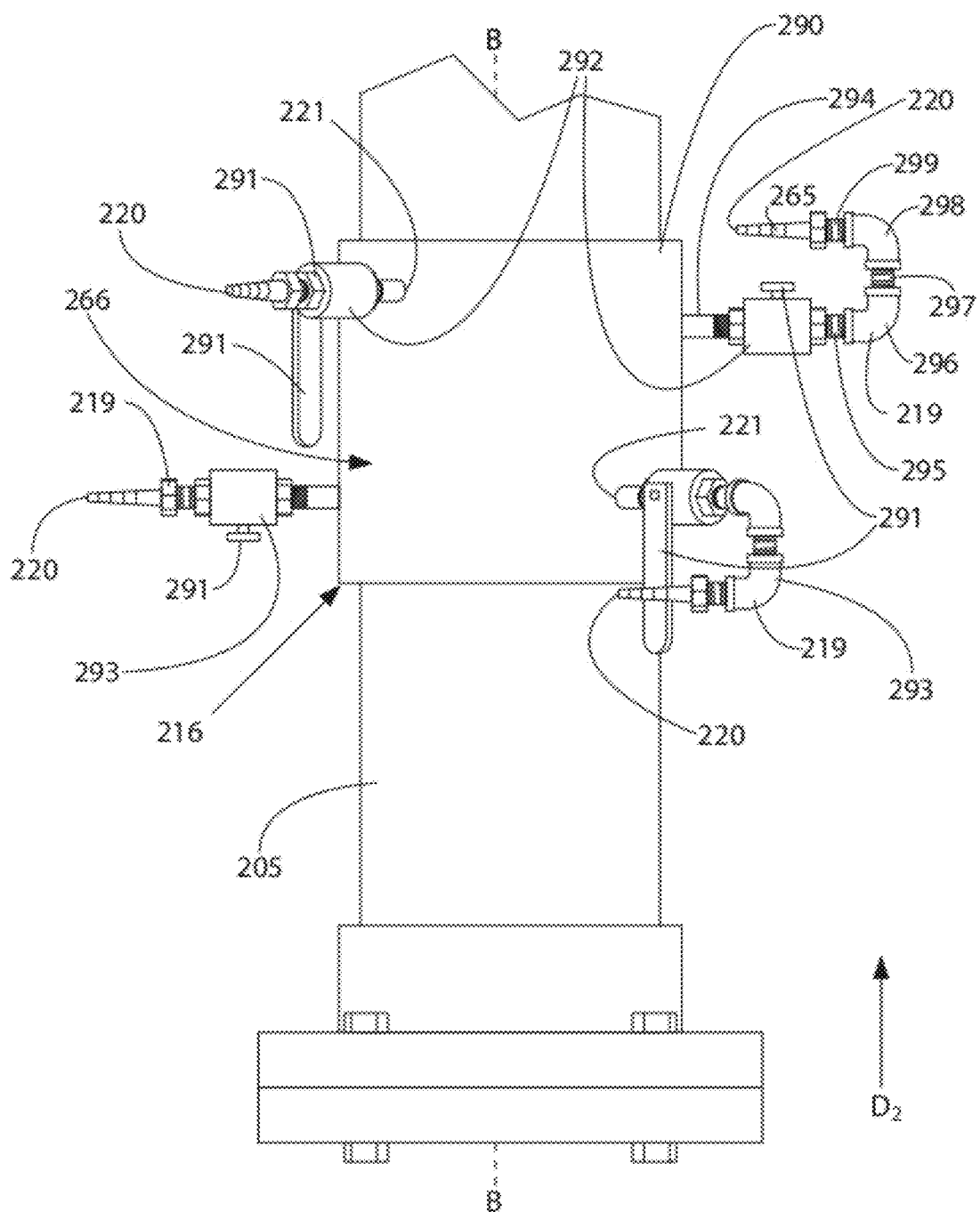
FIG. 5B is a side view of the polymer injector of FIG. 5A.

Referring to FIGS. 5A and 5B, an alternate arrangement of a second polymer injector 216 will be described. The second polymer injector 216 is the same as the first polymer injector 116 in numerous respects. Furthermore, it should be appreciated that the header 155 illustrated in FIG. 14 can be operably coupled to the injection nozzles of the second polymer injector 216 in a similar manner as described above with regard to the connection between the header 155 and the injection nozzles 119 of the first polymer injector 116. Thus, the focus of the description below will be on the differences between the second polymer injector 216 and the first polymer injector 116. Moreover, similar components will be similarly numbered except that the "200" series of numbers will be used to describe the components of the second polymer injector 216 whereas the "100" series of numbers was used to described the components of the first polymer injector 116. In the second polymer injector 216, the wastewater flows through the treatment line 205 in the direction illustrated by the arrow $D_2$.

The second polymer injector 216 is located at a conduit 290 of the treatment line 205 within which each of the injection nozzles 219 is operably connected at their second ends 221. In the exemplified embodiment, the conduit 290 is illustrated as an expanded diameter portion of the treatment line 205. Of course, the conduit 290 can have a narrower diameter or the same diameter as the treatment line 205 in other embodiments. The conduit 290 has an outer surface 266 and an axis B-B along which the wastewater flows in the direction $D_2$. Unlike the first polymer injector 116, the injection nozzles 219 are not aligned and equi-spaced about the axis B-B of the treatment line 205. The second polymer injector 216 exemplifies that the exact position at which the injection nozzles 219 are connected to the treatment line 205 is not limiting of the present invention in all embodiments. It is merely intended that the injection nozzles 219 enable the first aqueous polymer mixture to be injected into the treatment line 205 at multiple points simultaneously. Moreover, it is preferable that the multiple points be located on the conduit 290 of the treatment line 205 such that the multiple points are located proximate or very near to one another.

In the second polymer injector 216, the injection nozzles 219 are not equi-spaced about the axis B-B. Rather, a 180 degree portion of the outer surface 266 of the conduit 290 is free of injection nozzles 219 and the four injection nozzles 219 are all positioned along the other 180 degree portion of the outer surface 266 of the conduit 290. In the exemplified embodiment, a first nozzle 219A is circumferentially spaced 45° from a second nozzle 219B, the second nozzle 219B is circumferentially spaced 90° from a third nozzle 219C, and the third nozzle 219C is circumferentially spaced 45° from a fourth nozzle 219D. Moreover, the first nozzle 219A is circumferentially spaced 180° from the fourth nozzle 219D. Of course, the invention is not to be specifically limited by the spacing between the nozzles 219A-219D in all embodiments.

In the exemplified embodiment, the second polymer injector 216 comprises a first set 292 of a plurality of the injector nozzles 219 and a second set 293 of a plurality of the injector nozzles 219. The first set 292 of the injector nozzles 219 is located within a first plane that is substantially transverse to the axis B-B of the conduit 290 and the second set 293 of the injector nozzles 219 is located within a second plane that is substantially transverse to the axis B-B of the conduit 290. The first and second planes are spaced apart from one another along the axis B-B. Moreover, in certain other embodiments the first set 292 of the injector nozzles 219 and/or the second set 293 of the injector nozzles 219 may not be aligned within a single plane that is substantially transverse to the axis B-B and the injector nozzles 219 may be offset from one another along the axis B-B.

Each of the injector nozzles 219A-D comprises generally the same components, which will be described herein below. The nozzles 219A-D are operably connected to the conduit 290 by an adaptor 294. The adaptor 294 is a PVC to steel adaptor in the exemplified embodiment because the conduit 290 (and treatment line 205) is formed of a PVC piping and the nozzles 219A-D are formed of stainless steel. The adaptor 294 is threadily connected to the adjustable valve 291. In the exemplified embodiment, the adjustable valve 291 is a full port ball valve formed of brass. However, the invention is not to be so limited in all embodiments and the adjustable valve 291 can be other than a ball valve and can be formed of materials other than brass in other embodiments. A first threaded connector pipe 295 is threadily connected to and extends between the adjustable valve 291 and a first elbow 296. The first elbow is a 90° elbow pipe that changes the direction of the nozzles 219 by 90°. A second threaded connector pipe 297 is threadily connected to and extends between the first elbow 296 and a second elbow 298. The second elbow 296 is also a 90° elbow pipe that changes the direction of the nozzles 219 by 90°. A third threaded connector pipe 299 is threadily connected to and extends between the second elbow 298 and a tapered compression fitting 265. The compression fitting 265 comprises the first end 220 of the nozzles 219A-D and is therefore operably and fluidly coupled to the first polymer tank 117 when the embodiment illustrated in FIGS. 5A and 5B is used as the first polymer injector.

In certain embodiments, the second polymer injector 216 is used to inject the first aqueous polymer mixture into the wastewater and the first polymer injector 116 is used to inject a second aqueous polymer mixture into the wastewater (described below). However, the particular polymer injector that is used to inject each of the first and second aqueous polymer mixtures into the wastewater is not to be limiting of the present invention in all embodiments.

Referring again solely to FIG. 3, the wastewater treatment system 100 of the present invention will be further described. As noted above, in addition to injecting the first aqueous polymer mixture into the treatment line 105 at a plurality of points simultaneously, the flow rate at which the first aqueous polymer mixture is injected into the treatment line 105 is adjustable. As discussed above, the incoming wastewater is introduced into the treatment line 105 and passes through a turbidity sensor 101 which measures the turbidity of the incoming wastewater in NTU. The turbidity measurement of the incoming wastewater is then transmitted to the controller 110 by the turbidity transmitter 107 (see FIG. 7). As discussed below, the controller 110 then uses the turbidity measurement of the incoming wastewater and the flow rate of the incoming wastewater (which is a known and pre-set parameter in, certain embodiments and is measured by the flow sensor 103 in other embodiments) to adjust the flow rate of the first aqueous polymer mixture as the first aqueous polymer mixture is injected into the treatment line 105.

More specifically, the controller 110 is pre-programmed to inject the first aqueous polymer mixture into the treatment line 105 at a pre-determined flow rate based on an assumption (which may be formed due to a previous turbidity measurement of the wastewater) that the wastewater has a specific turbidity and that the wastewater is being introduced into the system 100 at a known or pre-set flow rate. As an example, it may be believed or pre-determined that the wastewater has a general turbidity of 300 NTU and that the wastewater is introduced into the system at a flow rate of 100 gallons per minute. The controller 110 is therefore programmed to inject the first aqueous polymer mixture at a specific flow rate that is intended to successfully flocculate all of the solids suspended in the wastewater based on the general turbidity of 300 NTU and the flow rate of 100 gallons per minute. If the turbidity sensor 101 then tests the turbidity of the incoming wastewater and determines that the turbidity is 600 NTU, the controller 110 will automatically increase the flow rate of the first aqueous polymer mixture as it is injected into the treatment line 105 in order to accommodate the increased turbidity in the wastewater.

When flocculation is occurring well at 300 NTU at a flow of 100 GPM, the amount of additional polymer needed is not proportional to the amount of added solids. In some cases a small amount of increase in polymer is provided for in the algorithm. Thus, in order to minimize costs and the amount of chemicals used, a change in turbidity from 300 NTU to 600 NTU will not result in doubling the flow rate of the first aqueous polymer mixture. Rather, a pre-programmed algorithm will determine the exact increase in flow rate of the first aqueous polymer mixture to achieve desired flocculation of the suspended solids. Thus, slight increases in the flow rate of the first aqueous polymer mixture can achieve desired benefits while minimizing polymer usage. Minimizing the amount of polymer that is used reduces costs and pollutants to the environment. In addition to the automated flow rate adjustments, the flow rate of injection of the first aqueous polymer mixture is also manually adjustable by the operator on the controller.

As noted above, the flow rate with which the wastewater is introduced into the wastewater treatment system 100 is also taken into account by the controller 110 when determining the flow rate of the injection of the first aqueous polymer mixture into the treatment line 105. If the flow rate of the wastewater is increased, the flow rate of the injection of the first aqueous polymer mixture into the treatment line 105 is also increased. If the flow rate of the wastewater is decreased, the flow rate of the injection of the first aqueous polymer mixture into the treatment line 105 is also decreased. Again, the exact amount of the increase or decrease of the flow rate of the injection of the first aqueous polymer mixture into the treatment line 105 is based on a pre-programmed algorithm and in certain embodiments it is not a 1:1 ratio increase. This algorithm ratio can be set by the operator in the controller 110. However, the invention is not to be so limited and the increase of flow rate of the injection of the first aqueous polymer mixture into the treatment line 105 can be a 1:1 increase relative to the flow rate (and/or the turbidity measurement) of the incoming wastewater if desirable for efficient and adequate flocculation.

Furthermore, the flow rate at which first aqueous polymer mixture is injected into the treatment line 105 is also dependent on the concentration of the polymer in the first aqueous polymer mixture. Thus, the lower the concentration of the polymer in the first aqueous polymer mixture, the greater the flow rate of the first aqueous polymer mixture that is needed to achieve the same results. The controller 110 can control the percent by weight of the raw polymer and the percent by weight of the recirculated water that together form the aqueous polymer mixture. Thus, if it is determined that the incoming wastewater turbidity is not at the extremely high levels, the percent by weight of the raw polymer in the aqueous polymer mixture can be decreased, whereas if the turbidity of the incoming wastewater is at the extremely high level, the percent by weight of the raw polymer in the aqueous polymer mixture can be increased by flowing an additional amount of the raw polymer into the tank 117.

Thus, the turbidity of the wastewater as measured by the turbidity sensor 101 and the flow rate of the wastewater are transmitted to the controller 110. In turn, the controller 110 automatically adjusts the flow rate at which the first aqueous polymer mixture is injected into the treatment line 105 to accommodate the turbidity measurement and the flow rate of the incoming wastewater and properly treat the wastewater. The controller 110 controls the flow rate at which the first aqueous polymer mixture is injected into the treatment line 105 by controlling the opening/closing of the adjustable valves 191/291 and/or by controlling activation of the pump 172. Thus, if the controller 110 determines that a greater amount of the first aqueous polymer mixture is desired to be introduced into the wastewater, the controller 110 can speed up operation of the pump 172 and/or increase the size of the opening in the adjustable valves 191/291. This automatic adjustment of the flow rate of the first aqueous polymer mixture injection occurs during operation of the wastewater treatment system 100. Thus, operation of the wastewater treatment system 100 does not need to be temporarily suspended during the adjustment period, but rather the adjustment occurs dynamically.

Referring to FIGS. 2A-3, as noted above the first polymer mixer 118 is located along and operably coupled to the treatment line 105 at a location downstream of the first polymer injector 116. Thus, after the wastewater passes through the first polymer injector 116 and the first aqueous polymer mixture is injected into the treatment line 105, the combined wastewater/first aqueous polymer mixture flows into the first polymer mixer 118 to form a first polymer treated wastewater. In some embodiments, the first aqueous polymer mixture can be injected directly into the first polymer mixer 118 by incorporating the first polymer injector 116 with the first polymer mixer 118. Whether or not the first aqueous polymer mixture can be injected directly into the first polymer mixer 118 is dependent upon the particular chemical/polymer that is used because different injection techniques work better with different polymers.

In the exemplified embodiment, the first polymer mixer 118 is a large tank that allows for effective mixing of the first aqueous polymer mixture with the wastewater. Effective mixing of the first aqueous polymer mixture with the wastewater facilitates accumulation of the floc for ease of removal of the solids from the wastewater. In certain embodiments, the first polymer mixer 118 is a 1,050 gallon cone bottom tank that contains a propeller or blender 199 for facilitating mixing of the first aqueous polymer mixture with the wastewater. However, the invention is not so limited in all embodiments and the size of the first polymer mixer 118 can be larger or smaller than 1,050 gallons as desired. Moreover, the shape of the first polymer mixer 118 is not to be limiting of the present invention in all embodiments and in certain other embodiments the first polymer mixer 118 can be cylindrically shaped rather than having a cone shape at the bottom.

The first polymer mixer 118 is operably coupled to a liquid level sensor 123 for monitoring a level of the liquid (i.e., the first polymer treated wastewater) within the first polymer mixer 118. Furthermore, a transfer pump 124 is operably coupled to the treatment line 105. The transfer pump 124 provides a hydraulic force to draw the first polymer treated wastewater from the first polymer mixer 118. In one preferred embodiment, the transfer pump 124 is operably coupled to a variable frequency drive that can change the speed with which the transfer pump 124 draws the first polymer treated wastewater from the first polymer mixer 118. The transfer pump 124 may be referred to herein as a variable frequency pump due to its operable coupling to the variable frequency drive.

The transfer pump 124 operates so as to ensure that there is a substantially constant amount of the first, polymer treated wastewater within the first polymer mixer 118. A substantially constant amount of the first polymer treated wastewater within the first polymer mixer 118 is maintained in order to promote a steady and unvarying mixing of the wastewater with the first aqueous polymer mixture. In one preferred embodiment, the transfer pump 124 is a Goulds 4BF15AO 20 Hp unit. Of course, the invention is not to be limited by the exact type of pump used as the transfer pump 124 and any other type of pump can be used.

In order to ensure that the liquid level of the first polymer treated wastewater in the first polymer mixer 118 is maintained at a substantially constant level, the liquid level sensor 123 monitors the liquid level of the first polymer treated wastewater in the first polymer mixer 118. The liquid level sensor 123 is operably coupled to the controller 110, which is programmed with a pre-determined liquid level threshold. Thus, if the controller 110, via signals received from the liquid level sensor 123, determines that the liquid level of the first polymer treated wastewater within the first polymer mixer 118 is above a pre-determined upper threshold, the speed of the variable frequency drive that operates the pump 124 increases in order to draw more of the first polymer treated wastewater from the first polymer mixer 118 to lower the liquid level of the first polymer treated wastewater within the first polymer mixer 118. Alternatively, if the controller 110, via signals received from the liquid level sensor 123, determines that the liquid level of the first polymer treated wastewater within the first polymer mixer 118 is below a pre-determined lower threshold, the speed of the variable frequency drive that operates the pump 124 decreases in order to enable more of the first polymer treated wastewater to fill the first polymer mixer 118.

In certain embodiments, the pre-determined upper threshold and the pre-determined lower threshold are substantially the same in order to maintain the liquid level of the first polymer treated wastewater at a substantially constant level. Moreover, in certain embodiments, this process occurs continuously to ensure a constant liquid level of the first polymer treated wastewater within the first polymer mixer 118 is maintained. It should be understood that the exact liquid level of the pre-determined liquid upper and/or lower thresholds can be reconfigured and reprogrammed into the controller 110 as desired.

In certain embodiments, it is desirable to add a second aqueous polymer mixture into the treatment line 105 to enhance coagulation/flocculation of the suspended solids within the wastewater and to further facilitate creation of the floc. Thus, the wastewater treatment system 100 further comprises a second polymer injector 125 and a third polymer injector 126 that are each operably coupled to the treatment line 105. Each of the second and third polymer injection ports 125, 126 are fluidly and operably coupled to a second polymer tank 127 by a second polymer injection line 163 and a third polymer injection line 164, respectively. The second polymer tank 127 contains the second aqueous polymer mixture therein.

Although there are two polymer injectors 125, 126 coupled to the second polymer tank 127, in most circumstances it is only desirable to inject the second aqueous polymer mixture into the treatment line 105 through one of the polymer injectors 125, 126. Thus, although there is the second polymer injector 125 located along the treatment line 105 after the first polymer mixer 118 and before the transfer pump 124 and the third polymer injector 126 located along the treatment line 105 after the transfer pump 124 and before a second mixer 128, only one of the second and third polymer injectors 125, 126 is used at a time. More specifically, certain polymers work better when aggressively mixed with the wastewater through the transfer pump 124 and other polymers work better being passively injected into the wastewater after the pump 124. Thus, depending on the exact polymer used in the second aqueous polymer mixture, the location at which the second aqueous polymer mixture is injected into the treatment line 105 can be altered between the second polymer injector 125 and the third polymer injector 126.

A pump 173 is operably coupled to the second polymer tank 127 in order to facilitate drawing the second aqueous polymer mixture from the second polymer tank 127 and directing the second aqueous polymer mixture to one of the second and third polymer injectors 125, 126. In order to prevent the second aqueous polymer mixture from flowing through both of the second polymer injection line 163 and the third polymer injection line 164, the second polymer injection line 163 is operably coupled to a valve 174 and the third polymer injection line 164 is operably coupled to a valve 175. Moreover, each of the valves 174, 175 are also operably coupled to the controller 110 so that the controller 110 can open and close the valves 174, 175 as desired. If it is desired to inject the second aqueous polymer mixture into the treatment line 105 at the second polymer injector 125, the valve 174 is opened and the valve 175 is closed. If it is desired to inject the second aqueous polymer mixture into the treatment line 105 at the third polymer injector 126, the valve 175 is opened and the valve 174 is closed. In certain embodiments, the valves 174, 175 may not be operably coupled to the controller 110 and opening and closing of the valves 174, 175 can be accomplished manually.

Each of the second and third polymer injectors 125, 126 can have a structural arrangement similar to the polymer injectors 116, 216 illustrated in FIGS. 4A-5B and discussed above. Thus, each of the second and third polymer injectors 125, 126 can inject the second aqueous polymer mixture into the wastewater at four points simultaneously. Alternatively, the second and third polymer injectors 125, 126 can take on other structural arrangements as long as the second aqueous polymer mixture is injected into the treatment line 105 at multiple points simultaneously as has been described herein above with regard to the first polymer injector 116. Filling of the second polymer tank 127 with the second aqueous polymer mixture will be described in detail below with reference to FIGS. 3 and 6. After the wastewater passes through the second and/or third polymer injectors 125, 126, the wastewater becomes a second polymer treated wastewater.

After the transfer pump 124 draws the first polymer treated wastewater from the first polymer mixer 118 and back into the treatment line 105 and through each of the second and third polymer injection ports 125, 126, the second polymer treated wastewater flows through the second mixer 128 that is operably coupled to the treatment line 105. The second mixer 128 is an in-line mixer similar in structure to the mixer 115 described above. The second mixer 128 facilitates mixing of the first polymer treated wastewater with the second aqueous polymer mixture to further facilitate the flocculation of the solids suspended within the wastewater.

Downstream of the second mixer 128, the second polymer treated wastewater continues to flow along the treatment line 105 into a separator 129. The separator 129 is operably coupled to the treatment line 105. In certain embodiments, the separator 129 is connected in-line with the treatment line 105. Moreover, in certain other embodiments, the separator 129 can be a permeable membrane, such as a high-strength, permeable, specially designed textile known as a Geotube®. However, the invention is not to be so limited and the separator 129 can also be any one of a sediment tank, settling pond, clarifier, etc. The invention will be described below with regard to a permeable membrane acting as the separator 129. However, it should be understood that any of the above components can be used in place of the permeable membrane as desired.

Referring to FIGS. 2B, 3, 8A and 8B concurrently, one preferred embodiment of the separator 129 will be discussed in more detail. The separator 129 is a stainless steel chamber that is divided into two separate compartments 129A, 129B. The compartments 129A, 129B are positioned in a side-by-side arrangement along the direction of flow of the wastewater such that the first compartment 129A can operate while the second compartment 129B is being serviced and vice versa as will be described in more detail below. Each of the compartments 129A, 129B is an 11.5 cubic yard chamber, and the two compartments 129A, 129B are identical. Each of the compartments 129A, 129B is designed to hold or house a 10 cubic yard permeable membrane (i.e., Geotube®), which is designed to capture flocculated solids while allowing water to pass through. Thus, in effect the permeable membrane acts as a strainer by ensuring that solids remain contained with the permeable membrane while allowing the water to flow therethrough. Of course, as noted above the invention is not limited to using a permeable membrane as the separator 129 in all embodiments, and the compartments 129A, 129B may merely be sediment tanks or the like as discussed above. Furthermore, the invention is not limited to the size of the compartments 129A, 129B or the size of the permeable membrane and the sizes of both can be configured as desired depending on space requirements. Each of the compartments 129A, 129B contains a hinged door 130A, 130B that allows access to the permeable membrane housed therein.

As water flows along the treatment line 105 towards the separator 129, the treatment line 105 splits into a compartment one treatment line 105A and a compartment two treatment line 105B. The system is designed so that the polymer treated wastewater can flow into only one of the first and second compartments 129A, 129B at a time. Of course, in other embodiments the polymer treated wastewater can be allowed to flow into both of the first and second compartments 129A, 129B simultaneously. The compartment one treatment line 105A is operably coupled to a valve 132A and the compartment two treatment line 105B is operably coupled to a valve 132B. In the exemplified embodiment, each of the valves 132A, 132B is also operably coupled to the controller 110 to automate opening and closing of the valves 132A, 132B as desired. However, in certain other embodiments the valves 132A, 132B may not be operably coupled to the controller 110 and operation of the valves 132A, 132B may be accomplished manually.

During operation when the valve 132A is open and the valve 132B is closed, the polymer treated wastewater will flow past the mixer 128, past the valve 132A, through the compartment one treatment line 105A and into the first compartment 129A while being prevented from entering into the compartment two treatment line 105B by the valve 132B. Within the first compartment 129A, the polymer treated wastewater flows into the permeable membrane that is housed within the first compartment 129A. The permeable membrane within the first compartment 129A traps the flocculated suspended solids 310 (see FIG. 2B) within the polymer treated wastewater, while allowing treated water 311 (see FIG. 2B) with the flocculated suspended solids removed to flow through the separator 129 (i.e., permeable membrane). The treated water 311 that flows through the separator 129 will flow out of the first compartment 129A and into a sump 131 that is operably coupled to the treatment line 105 downstream of the separator 129.

While the treated water is flowing out of the first compartment 129A, the flocculated solids 310 are trapped within the permeable membrane that is housed within the first compartment 129A. This process continues until the permeable membrane within the first compartment 129A is completely filled with the flocculated solids 310. At this time, the system 100 (i.e., the controller 110) will close the valve 132A that provides entry into the first compartment 129A and open the valve 132B that provides entry into the second compartment 129B. Of course, in other embodiments the valves 132A, 132B can be opened and/or closed manually. In certain embodiments, the controller 110 operates the valves 132A, 132B based on the weight of the compartments 129A, 129B such that when the weight of the first compartment 129A exceeds a threshold, the controller 110 will determine that the first compartment is full and that the valve 132A should be closed and that the valve 132B should be opened.

As a result, without discontinuing the flow of the polymer treated wastewater into the separator 129, the polymer treated wastewater will begin entry into the second compartment 129B and stop entering into the first compartment 129A. At this time, an operator can approach the first compartment 129A and open the hinged door 130A to gain access to the permeable membrane housed within the first compartment 129A. Because the permeable membrane housed within the first compartment 129A is full of solids 310, the operator can remove the permeable membrane and replace it with a new permeable membrane, or can clean the permeable membrane by removing the solids from it. Once solids are removed from the permeable membrane, it can be replaced back into the first compartment 129A.

Furthermore, in certain instances the permeable membrane becomes blinded despite it not being full of solids. In such instances, an operator can power wash the outside of the membrane to clear out any blinding solids and place the membrane back into service. For removal and replacement of the permeable membrane, a 25 yard roll off box can be placed at or near the back of the trailer. The permeable membrane has pulling straps that allows a tractor or heavy equipment to attach a strap and pull the permeable membrane from the compartment 129A into the roll off box for disposal or applying the solids with other excavated solids at the site.

In some embodiments, the compartments 129A and 129B are located external, to the treatment trailer 10 (illustrated and discussed in more detail below with reference to FIG. 13). This would be done in cases where a larger amount of solids are being processed and a larger container and permeable membrane is being used. Furthermore, in certain embodiments the system 100 includes compartments that are located within the trailer and compartments that are located external to the trailer. In such embodiments, the system 100 can determine whether to flow the wastewater through the internal or external separator compartments, or both, depending on efficiency calculations that can be completed manually or automatically by the properly programmed controller 110.

As noted above, water will leave the separator 129 as treated water 311 because the suspended solids 310 will have been removed, the pH will have been treated (if necessary), and the water should at that stage be at or near required discharge limitations. As used herein, the term wastewater may include the untreated water, the water after treatment with the first aqueous polymer mixture, the water after treatment with the second aqueous polymer mixture and the water after it passes through the separator. However, the wastewater may be referred to with different terms at different locations within the treatment line 105 as a result of the treatment that it is receiving.

Thus, in certain embodiments, the water comes into the wastewater treatment system 100 as wastewater. After the wastewater passes through the pH adjustment chemical injector 114, the wastewater becomes a pH treated wastewater. After the pH treated wastewater passes through the first polymer injector 116, the pH treated wastewater becomes a first polymer treated wastewater. After the first polymer treated wastewater passes through the second and/or the third polymer injectors 125, 126 (depending upon which of the second and/or third polymer injectors 125, 126 injects the second aqueous polymer mixture into the treatment line 105), the first polymer treated wastewater becomes a second polymer treated wastewater. Finally, after the second polymer treated wastewater passes through the separator 129, the second polymer treated wastewater becomes treated water.

As the treated water 311 leaves the separator 129, the treated water 311 will enter into the sump 131. Operably coupled to the sump 131 is a liquid level sensor 133 and a transfer pump 134. Moreover, each of the liquid level sensor 133 and the transfer pump 134 is operably coupled to the controller 110 to further automate operation of the system 100. As will be described in detail below, operation of the transfer pump 134 is controlled by the controller 110 in response to signals received by the controller 110 from the liquid level sensor 133. In certain embodiments, the transfer pump 134 is a Goulds 4BF15AO 20 Hp unit. Of course, the invention is not to be limited by the exact pump used as the transfer pump 134. Moreover, in certain embodiments the transfer pump 134 can be replaced by any other mechanism that is capable of drawing water from the sump 131 for further processing and treatment.

The liquid level sensor 133 continuously monitors the liquid level of the treated water within the sump 131. When the liquid level sensor 133 detects that the liquid level of the treated water within the sump 131 is below a pre-determined lower threshold, the transfer pump 134 is turned off and the treated water is not drawn from the sump 131. When the liquid level sensor 133 detects that the liquid level of the treated water within the sump is above a pre-determined upper threshold, the transfer pump 134 is turned on and the treated water is drawn from the sump 131. Moreover, if the liquid level sensor 133 detects that the liquid level of the treated water within the sump 131 is above a pre-determined dangerous threshold, the wastewater introduction pump 50 and the transfer pump 124 will both be turned off to shut down the wastewater treatment system 100. Thus, the liquid level sensor 133 will detect if the separator 129 becomes overwhelmed and overflowed with wastewater and solids such that the wastewater treatment system 100 needs to slow down or shut down to enable the separator 129 to be cleaned or replaced. Even if the wastewater introduction pump 50 and the transfer pump 124 are shut down, the transfer pump 134 will continue normal operations in order to continue drawing water from the sump 131 as water continues to enter into the sump 131 from the separator 129.

In certain embodiments, the liquid level sensor 133 is a float that transmits signals representative of the liquid level of the treated water in the sump 131 to the controller 110 so that the controller 110 can automatically control operation of the transfer pump 134 (and, in certain situations as described above, also the wastewater introduction pump 50 and the transfer pump 124). Of course, the invention is not limited to the liquid level sensor 133 being a float, and the liquid level sensor 133 can take on other forms.

Figure 9:
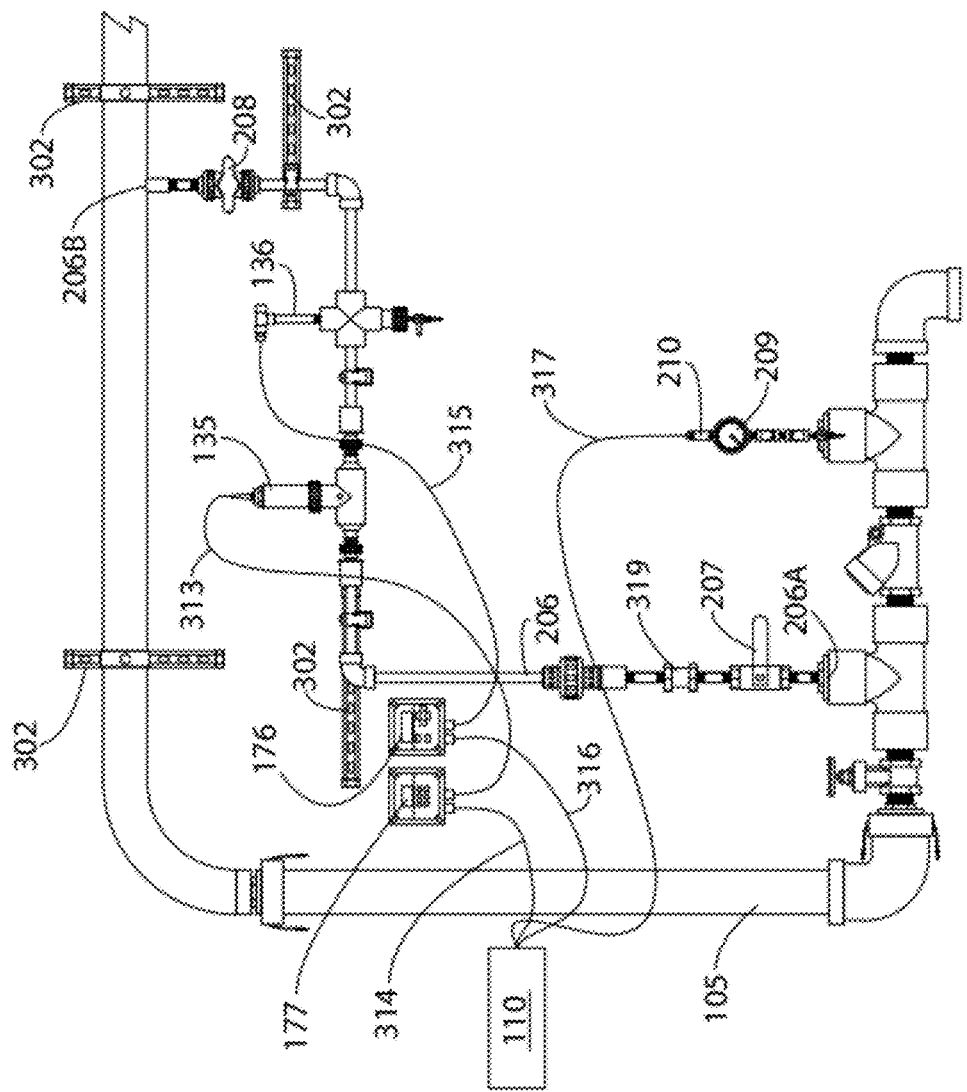
FIG. 9 is a schematic of a turbidity and pH monitoring system in accordance with a second embodiment of the present invention.

Referring to FIGS. 3 and 9 concurrently, the wastewater treatment system 100 will be further described. In order to monitor the effectiveness of the first and second/third polymer injectors 116, 125/126 and the separator 129, the treated water will be pumped into the treatment line 105 from the sump 131 by the transfer pump 134 and the treated water will pass through a second turbidity sensor 135 and a second pH sensor 136. The second turbidity sensor 135 will measure the turbidity of the treated water in NTU and the second pH sensor 136 will measure the pH of the treated water. If the turbidity and pH of the treated water is not in compliance with regulated discharge limitations, the treated water can be re-circulated back into the water source 20 or other location from where it came, or it can be re-circulated back into the wastewater treatment system 100 at a location prior to the first pH and turbidity sensors 101, 102.

The second turbidity sensor 135 is operably coupled to the controller 110 via a turbidity transmitter 176 and the second pH sensor 136 is operably coupled to the controller 110 via a pH transmitter 177. More specifically, the second turbidity sensor 135 is operably coupled to the turbidity transmitter 176 by a wire 313 and the turbidity transmitter 176 is operably coupled to the controller 110 by a wire 314. The second pH sensor 136 is operably coupled to the pH transmitter 177 by a wire 315 and the pH transmitter 177 is operably coupled to the controller 110 by a wire 316. Although the connections between the second turbidity and pH sensors 135, 136, the turbidity and pH transmitters 176, 177 and the controller 110 are illustrated with wires, other connection techniques can be used such as wireless communication.

The second turbidity sensor 135 is operably coupled to a second sensor flow line 206. The second sensor flow line 206 has an inlet 206A and an outlet 206B, each of which is fluidly coupled to the treatment line 105. Thus, only a portion of the treated water that flows through the second sensor flow line 206 is tested for turbidity and pH by the second turbidity and pH sensors 135, 136. Of course, the invention is not to be so limited in all embodiments and in certain other embodiments the second sensor flow line 206 can be omitted and the second turbidity and pH sensors 135, 136 can be operably coupled directly to the treatment line 105. The flow of treated water into and out of the second sensor flow line 206 is controlled by an inlet valve 207 and an outlet valve 208, which can be manually operated or automatically operated by virtue of an operable coupling to the controller 110. A pressure gauge 209 is also operably coupled to the treatment line 105 for measuring the pressure of the treated water as it flows through the treatment line 105. The pressure gauge 209 is operably coupled to a pressure transmitter 210, which in turn is operably coupled to the controller 110 by a wire 317. Moreover, additional strut channels 302 are provided for supporting the electrical, plumbing and mechanical components of the system 100.

During use of the wastewater treatment system 100, a portion of the wastewater will flow through the treatment line 105 while another portion of the wastewater flows through the sensor flow line 206 for testing by the pH and turbidity sensors 135, 136. Flow of the wastewater into the sensor flow line 206 is controlled by the inlet valve 207 as noted above. When wastewater flows passed the inlet valve 207, the wastewater flows into a dole valve 319. The dole valve 319 is similar to the dole valve 309 described above in that it is a restriction in the piping that ensures that the wastewater flows through the sensor flow line 206 at a constant flow rate, such as between 0-20 gallons per minute, 5-15 gallons per minute, or more preferably approximately five gallons per minute. The flow rate of the wastewater through the sensor flow line 206 is specifically calculated to ensure that the second turbidity and pH sensors 135, 136 can adequately and accurately measure the turbidity and pH of the wastewater.

After passing through the second turbidity and pH sensors 135, 136, the treated water flows back into the treatment line 105 through the outlet 206B of the sensor flow line 206. Downstream of the second turbidity and pH sensors 135, 136, the treated water will flow into a sand filter system 137 that is operably and fluidly coupled to the treatment line 105.

Referring now to FIGS. 2A-3, the sand filter system 137 will be further described. In certain embodiments, the sand filter system 137 is formed by three stainless steel thirty-six inch diameter sand pod filters 137A, 137B, 137C that are positioned in a side-by-side arrangement. Of course, the invention is not to be limited in all embodiments by the size or number of sand pod filters used. During use, the treated water passes through each of the three sand pod filters of the sand filter system 137. When the differential of the water pressure across the sand filter system 137 becomes too high, the sand filter system 137 will automatically backwash. During backwashing, water passes through two of the three sand pod filters of the sand filter system 137 and is used to backwash the third pod of the sand filter system 137. Backwashing is completed on an adjustable timer. In certain embodiments, backwashed water is re-directed into the water source 20 for re-processing. In other embodiments the backwashed water can be redirected into the wastewater treatment system 100 at a desired location, such as upstream of the first polymer injector 116, directly into the mixing tank 118, or at any other location as desired depending on the amount of treatment that is required for the backwashed water. After the first pod 137A of the sand pod system 137 is finished automatically backwashing, the second pod 137B of the sand filter system 137 and then the third pod 137C of the sand filter system 137 are backwashed. The sand filter system 137 captures any remaining solids from the treated water that were able to pass through the separator 129.

In certain preferred embodiments, the three sand pod sand filter system 137 can filter an average of at least 300 gallons of treated water per minute. Each of the three pods 137A-C contains approximately 800 pounds of silica sand having 0.44-0.55 uniformity with a coefficient of 1.6 (2,400 pounds total) and approximately 400 pounds of ¾×½ gravel (1,200 pounds total). Of course, other weights, uniformities and coefficients of silica sand, gravel and other known materials used for sand pod systems can be used in place of the above.

From the sand filter system 137, the treated water flows along the treatment line 105 into a bag filter system 138 for final polishing. In certain embodiments, the bag filter system 138 comprises four stainless steel bag filter housings 138A, 138B, 138C, 138D, each of which is thirty inches in length and eight inches in diameter. Of course, other numbers of bag filter housings and other sizes can be used in certain other embodiments as desired. The bag filter housings 138A-D are arranged and plumbed in parallel to allow changing of bag filters without shutting down the system. Thus, while the first bag filter housing 138A of the bag filter system 138 is being changed or replaced, the other three bag filter housings 138B-D will continue to polish the treated water. The bag filter system 138 further comprises a pressure monitor for monitoring a pressure of the filter housings. When the pressure differential achieves a set or pre-determined pressure, the orange light will illuminate on the trailer 10 to indicate that an operator is needed to service the bag filters.

After leaving the bag filter system 138, the treated water will pass through a third turbidity sensor 139 and a third pH sensor 140. Although not illustrated, the treated water will also preferably pass through a flow meter and a check valve downstream of the bag filter system 138 to further ensure that the wastewater treatment system 100 is operating properly.

Figure 10:
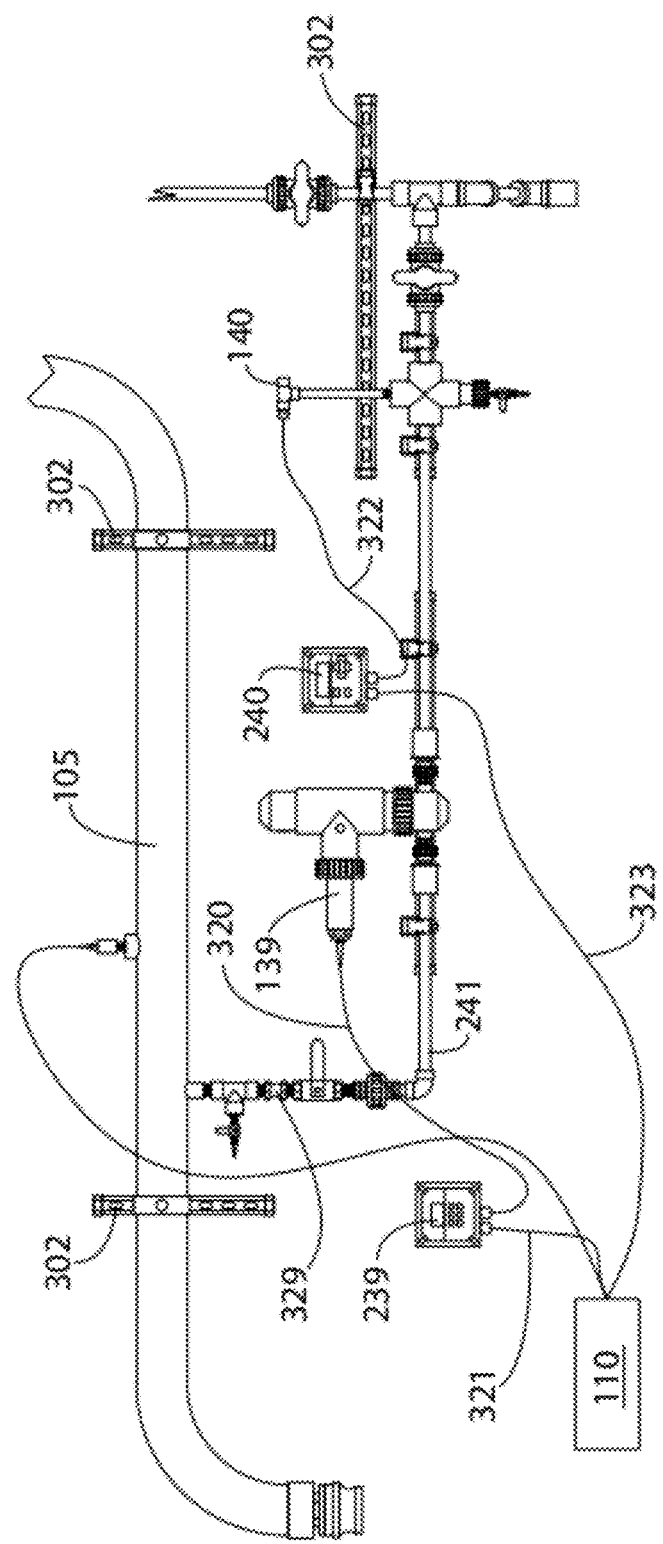
FIG. 10 is a schematic of a turbidity and pH monitoring system in accordance with a third embodiment of the present invention.

Referring to FIGS. 3 and 10 concurrently, the third turbidity sensor 139 and the third pH sensor 140 will be further described. The third turbidity sensor 139 and the third pH sensor 140 are the final monitoring sensors of the water to confirm compliance with regulated discharge limitations. Water being discharged to fresh water streams or elsewhere must comply with strictly regulated limitations in terms of pH and turbidity so as not to damage the ecological systems or environment into which the water is being discharged. Therefore, if the treated water fails to comply with discharge limitations for pH or turbidity, the entire wastewater treatment system 100 will shut down. Furthermore or alternatively, if the treated water fails to comply with discharge limitations as noted above, the treated water can be re-circulated back through the system by discharging the treated water back to the water source 20 or re-circulating the treated water back into the wastewater treatment system 100 at a location prior to the first turbidity and pH sensors 101, 102 or any other desired location within the wastewater treatment system 100.

Moreover, the third turbidity sensor 139 is operably coupled to a third turbidity transmitter 239 via a wire 320 and the third turbidity transmitter 239 is operably coupled to the controller 110 by a wire 321. Furthermore, the third pH sensor 140 is operably coupled to a third pH transmitter 240 by a wire 322 and the third pH transmitter 240 is operably coupled to the controller 110 by a wire 323. In the exemplified embodiment, the third turbidity sensor 139 and the third pH sensor 140 are operably coupled to a sensor flow line 241. In certain other embodiments, the sensor flow line 241 may be omitted and the third turbidity and pH sensors 139, 140 can be operably coupled directly to the treatment line 105. Additional strut channels 304 are present for supporting the electrical, plumbing and mechanical components of the system 100.

The wastewater enters into the sensor flow line 241 through a valve 249 similar to what has been described above with regard to the sensor flow lines 106, 206. Upon passing through the valve 249, the wastewater must pass through a dole valve 329. The dole valve 329 is similar to the dole valves 309, 319 described above. Thus, the dole valve 329 is a restriction in the piping that ensures that the wastewater flows through the sensor flow line 241 at a constant flow rate. The dole valve 329 has the appearance of a normal pipe coupling, but comprises an internal orifice that restricts the gallons per minute that can flow through the dole valve 329. The wastewater can flow through the dole valve 329 between 0-20 gallons per minute, 5-15 gallons per minute, or more preferably approximately five gallons per minute. The flow rate of the wastewater through the sensor flow line 241 is specifically selected to ensure that the third pH sensor 140 and the third turbidity sensor 139 can adequately and accurately measure the pH and turbidity of the wastewater.

In some embodiments, the third turbidity sensor 139 and the third pH sensor 140 may cause the controller 110 to automatically adjust the flow rate of the incoming wastewater into the treatment line 105 and the amount of the pH adjustment chemical that is injected into the treatment line 105. Thus, if it is determined that the pH and turbidity levels are not up to compliance with regulated discharge limitations, adjustments can be automatically made within the wastewater treatment system 100 by controlling operation of various of the previously described pumps and valves based on signals sent to the controller 110 from the third turbidity and pH sensors 139, 140.

Referring again solely to FIG. 3, the wastewater treatment system 100 will be further described. Located downstream from the third turbidity sensor 139 and the third pH sensor 140 is a valve 178. The valve 178 is operably connected to the treatment line 105, the controller 110 and to a recirculation line 150. In the exemplified embodiment, the valve 178 is a three-way valve. However, the invention is not to be so limited in all embodiments and the valve 178 can be formed by two two-way valves of any other configuration of multiple valves as desired.

The valve 178 comprises a discharge valve passageway 178A that permits or prohibits treated water from flowing through the treatment line 105 to an outlet 141 and a recirculation valve passageway 178B that permits or prohibits treated water from flowing through the treatment line 105 to the recirculation line 150. If the treated water leaving the bag filter system 138 has a measured pH and turbidity level that complies with discharge limitations, the discharge valve portion 178A of the valve 178 will be opened to enable a portion of the treated water to flow through the treatment line 105 to the outlet 141 for discharge. If the wastewater treatment system 100 is housed within the trailer 10, the outlet 141 will discharge the treated water from the trailer 10. The outlet 141 may be coupled to a discharge pipe, such as the effluent line 55 (see FIG. 1) that will take the treated water to the desired location, which may be a stream, a lake, a river, an ocean or any other desired and appropriate location for the discharge of treated water.

As noted above, only a portion of the treated water is discharged from the outlet 141 to the desired location. Another portion of the treated water, referred to herein as the re-circulated portion of the treated water, flows through the re-circulation line 150 of the wastewater treatment system 100 and is used to form the first and second aqueous polymer mixtures that are stored in the first and second polymer tanks 117, 127. The recirculation line 150 is operably coupled to the treatment line 105 downstream of the bag filter 138. In the exemplified embodiment, the recirculation line 150 is also downstream of the third turbidity and pH sensors 139, 140. The treated water is able to flow through the recirculation line 150 when the recirculation valve passageway 178B is opened. The degree to which the recirculation valve passageway 178B is opened can be controlled so that it can be fully opened to enable a full flow of treated water into the recirculation line 150 or partially opened to enable only a partial flow of treated water into the recirculation line 150. Once the recirculation valve passageway 178B is opened, the recirculated portion of the treated water flows through the recirculation line 150 until it reaches first and second automated valves 142, 143.

There are several components that are operably and fluidly coupled to the recirculation line 150. The components that are operably and fluidly coupled to the recirculation line 150 are used to refill the first and second polymer tanks 117, 127 when desired as discussed in detail below. Thus, there is a first raw polymer tank 144, a second raw polymer tank 145, and two mixers 146, 147 operably coupled to the re-circulation line 150. However, in certain embodiments as will be discussed in detail below with reference to FIG. 13, the first and second polymer tanks 117, 127 are completely omitted from the system. In such embodiments the recirculated water is mixed with the raw polymers prior to injection into the wastewater, but the mixture of the recirculated water with the raw polymer is not stored in a tank.

The first raw polymer tank 144 contains a first raw polymer. As will be described in detail below, the first raw polymer is mixed with the re-circulated portion of the treated water to form the first aqueous polymer mixture, which is then stored in the first polymer tank 117. The first raw polymer is a polymer that flocculates solids that are suspended within the wastewater. Examples of polymers that can be used as the first raw polymer includes chitosan or any other polymer that is designed to accomplish the desired effect.

The second raw polymer tank 145 contains a second raw polymer. As will be described in detail below, the second raw polymer is mixed with the re-circulated portion of the treated water to form the second aqueous polymer mixture, which is then stored in the second polymer tank 127. The second raw polymer assists with the flocculation of solids that are suspended within the wastewater. Examples of polymers that can be used as the second raw polymer includes LBP-2101 or any other polymer that is designed to accomplish the desired effect.

Figure 6:
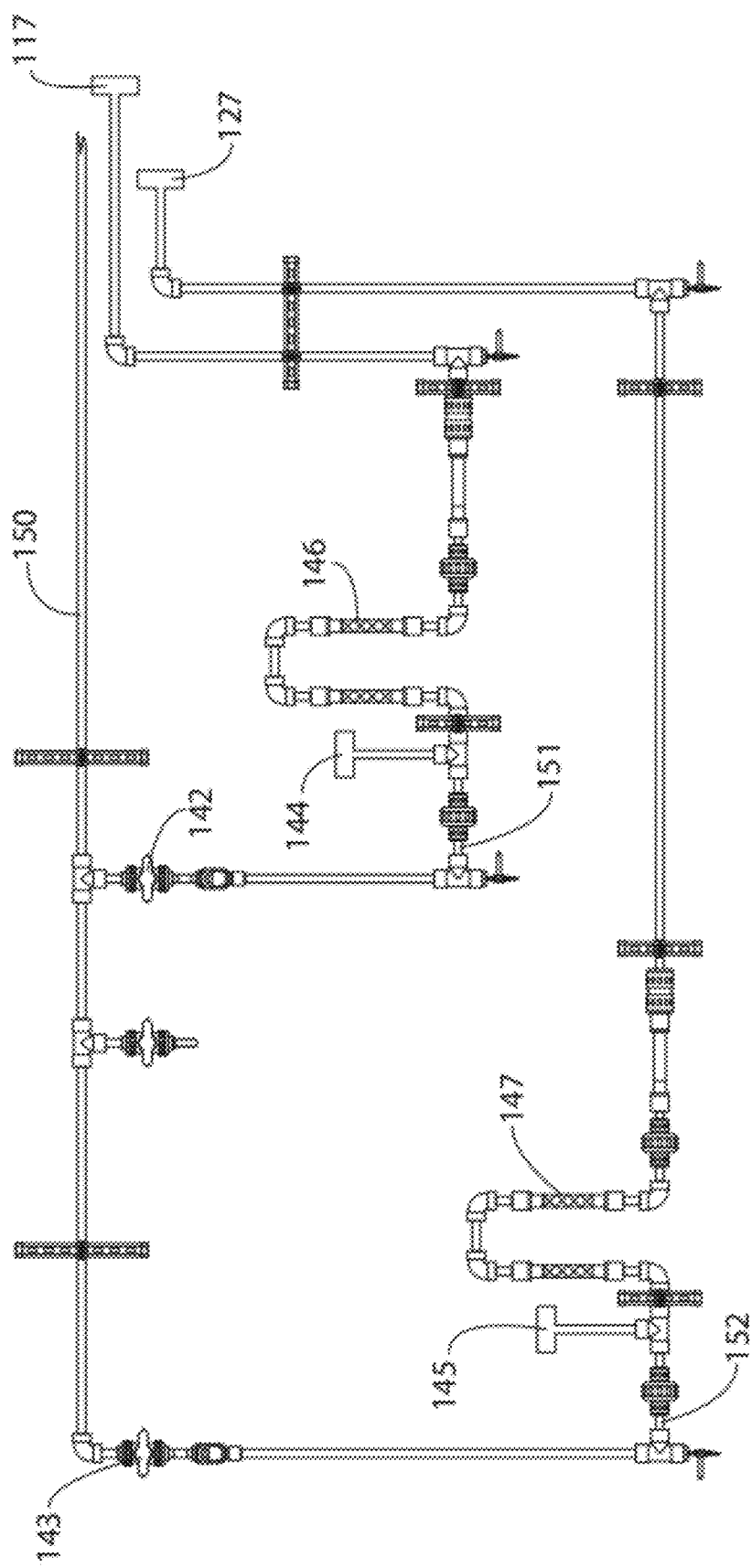
FIG. 6 is a schematic of an automatic polymer injection system in accordance with an embodiment of the present invention.

Referring to FIGS. 3 and 6 concurrently, the automatic refill feature of the first and second polymer tanks 117, 127 will be described. The first polymer tank 117 is automatically refilled as described below. As mentioned above, the first polymer tank 117 is operably coupled to the liquid level sensor 148, which is, also operably coupled to the controller 110. The liquid level sensor 148 monitors a liquid level of the first aqueous polymer mixture within the first polymer tank 117. When the liquid level of the first aqueous polymer mixture within the first polymer tank 117 is above a predetermined upper threshold, the first automated valve 142 is closed, thereby preventing the recirculated portion of the treated water from flowing into the first polymer tank 117. However, when the liquid level of the first aqueous polymer mixture within the first polymer tank 117 is at or below a pre-determined lower threshold, the controller 110 opens the first automated valve 142 to enable the re-circulated portion of the treated water to flow through a first refill line 151 towards the first polymer tank 117.

Simultaneous with the opening of the first automated valve 142, the controller 110 operates a pump 153 that is operably coupled to the first raw polymer tank 144. Thus, the pump 153 draws the first raw polymer from the first raw polymer tank 144, thereby introducing the first raw polymer into the re-circulated portion of the treated water in the first refill line 151. It should be understood that the first refill line 151 is operably coupled to the recirculation line 150 and can be considered to form a portion of the recirculation line 150. Moreover, although the invention is herein described with the controller 110 automating operation of the first automated valve 142 and the pump 153, the first automated valve 142 and the pump 153 can be operated manually in other embodiments.

The combined re-circulated portion of the treated water and first raw polymer flow through the mixer 146. In the exemplified embodiment, the mixer 146 is operably coupled to the first refill line 151 in a U-configuration. The U-configuration optimizes mixing of the recirculated portion of the treated water with the first raw polymer. However, the invention is not to be limited to the mixer 146 having a U-configuration and in other embodiments the mixer 146 can be positioned in-line with the first refill line 151.

The first mixer 146 mixes the re-circulated portion of the treated water with the first raw polymer to form the first aqueous polymer mixture. The first aqueous polymer mixture then passes through the mixer 146 and flows along and within the first refill line 151 until it enters into the first polymer tank 117 where it is stored for use as has been described in detail above. The re-circulated portion of the treated water is allowed to flow past the automated valve 142 until the liquid level sensor 148 measures that the liquid level of the first aqueous polymer mixture in the first polymer tank 117 rises to at or above a predetermined upper threshold. At such time, the automated valve 142 is closed (either automatically by the controller 110 or manually by a user) so that the re-circulated portion of the treated water can no longer flow towards the first polymer tank 117. At the same time, the pump 153 ceases operation (also either automatically by the controller 110 or manually by a user) so that the first raw polymer is no longer introduced into the first refill line 151. The first automated valve 142 remains closed and the pump 153 remains off until the liquid level of the first aqueous polymer mixture in the first polymer tank 117 is again below the pre-determined lower threshold, at which time the process of opening the automated valve 142 and operating the pump 153 occurs again as described above.

Thus, a batch of the first aqueous polymer mixture is stored in the first polymer tank 117. The batch of the first aqueous polymer mixture is formed as described above by injecting or introducing the first raw polymer into the re-circulated portion of the treated water. The liquid level sensor 148 monitors the liquid level of the batch and forms an additional amount of the first aqueous polymer mixture as described above when the liquid level of the batch falls below the predetermined lower threshold. Furthermore, as noted above the controller 110 can determine, based on data transmitted to the controller 110 from the transmitters and sensors, how dilute to make the aqueous polymer mixture and can alter the amount of pure polymer, in terms of percent by weight, is in the aqueous polymer mixture stored in the first polymer tank 117.

The first aqueous polymer mixture has a usable life cycle. After the expiration of the usable life cycle of the first aqueous polymer mixture, the effectiveness of the first aqueous polymer mixture drops below a pre-determined acceptable value. In the exemplified embodiment and as described herein, the life cycle is dictated by the aqueous polymer mixture rather than the raw polymer. It should be understood that in embodiments where the raw polymer is not mixed with water prior to introduction into the treatment line 105, the usable life cycle may be dictated by the raw polymer. The life cycle of any given aqueous polymer mixture or raw polymer is provided by the manufacturer or may merely be understood in the art.

The first aqueous polymer mixture is most effective when it is used within a period of time. After the period of time expires, the first aqueous polymer mixture is either ineffective or less than optimally effective. As such, the maximum volume of the batch that is stored in the first polymer tank 117 is carefully selected so that a single turnover of the batch is achieved within the usable life cycle of the first aqueous polymer mixture. Thus, the pre-determined upper threshold of the liquid level of the first aqueous polymer mixture in the first polymer tank 117 corresponds with a carefully selected maximum volume of the first aqueous polymer mixture. In a single turnover of the batch, the entirety of the maximum volume of the first aqueous polymer mixture is depleted during the usable life cycle of the first aqueous polymer mixture.

As a non-limiting example, some polymers (raw polymers and/or aqueous polymer mixtures) are only fully operable for twenty-four hours. In such a circumstance, it is desirable that the polymer is completely used during that twenty-four hour time period to reduce waste and optimize effectiveness. Thus, the batch size of the aqueous polymer mixture in the first polymer tank 117 will be chosen so that the entire batch is used up within the twenty-four hour time period. The wastewater treatment system 100 can automatically adjust the batch size according to the life cycle of the polymer that is being used and in response to changes in the flow rate of the aqueous polymer mixture into the wastewater as has been described in detail above.

Still referring to FIGS. 3 and 6 concurrently, the second polymer tank 127 is automatically refilled in a manner similar to the refilling of the first polymer tank 117 discussed above. The second polymer tank 127 is operably coupled to a liquid level sensor 149. The liquid level sensor 149 is in turn operably coupled to the controller 110. The liquid level sensor 149 monitors a liquid level of the second aqueous polymer mixture in the second polymer tank 127. When the liquid level of the second aqueous polymer mixture within the second aqueous polymer tank 127 is at or above a pre-determined upper threshold, the second automated valve 143 remains closed. However, when the liquid level of the second aqueous polymer mixture within the second polymer tank 127 is at or below a pre-determined lower threshold, the second automated valve 143 opens to enable the re-circulated portion of the treated water to flow through a second refill line 152. In the exemplified embodiment, operation (opening/closing) of the second automated valve 143 is achieved automatically by the controller 110 in response to signals received from the liquid level sensor 149 regarding the liquid level of the second aqueous polymer mixture within the second aqueous polymer tank 127. However, the invention is not so limited in all embodiments and operation of the second automated valve 143 may be accomplished manually in certain other embodiments.

Simultaneous with the opening of the second automated valve 143, a pump 154 that is operably coupled to the second raw polymer tank 145 draws the second raw polymer from the second raw polymer tank 145. The pump 154 is also operably coupled to the controller 110 so that operation of the pump 154 can be completely automated. Of course, the invention is not to be so limited in all embodiments and in certain other embodiments operation of the pump 154 can be accomplished manually. Drawing the second raw polymer from the second raw polymer tank 145 results in the second raw polymer flowing and being introduced into the re-circulated portion of the treated water in the second refill line 152. In the exemplified embodiment, the second refill line 152 is operably coupled to the recirculation line 150. However, it should be understood that in certain other embodiments the second refill line 152 forms a part of the recirculation line 150.

The combined re-circulated portion of the treated water and second raw polymer flow through the mixer 147 that is operably coupled to the second refill line 152 in a U-configuration. The U-configuration optimizes mixing of the recirculated portion of the treated water with the first raw polymer. However, the invention is not to be limited to the mixer 147 having a U-configuration and in other embodiments the mixer 147 can be positioned in-line with the second refill line 152. The mixer 147 mixes the re-circulated portion of the treated water with the second raw polymer to form the second aqueous polymer mixture. The second aqueous polymer mixture then passes through the mixer 147 until it enters into the second polymer tank 127 where it is stored for use as has been described in detail above.

The re-circulated portion of the treated water is allowed to flow past the second automated valve 143 until the liquid level sensor 149 determines that the liquid level of the second aqueous polymer mixture has reached a predetermined upper threshold. At such time, the second automated valve 143 is closed (either automatically by the controller 110 or manually) so that the re-circulated portion of the treated water can no longer flow through the second refill line 152 towards the second polymer tank 127. At substantially the same time, the pump 154 ceases operation (also either automatically by the controller 110 or manually) so that the second raw polymer is no longer introduced into the second refill line 152. The second automated valve 143 remains closed and the pump 154 remains off until the liquid level of the second aqueous polymer mixture in the second polymer tank 127 is once again measured at or below the pre-determined lower threshold.

In furtherance to the above, additional features can be incorporated into the wastewater treatment system 100 of the present invention. In certain circumstances, it may be determined that the wastewater treatment system 100 is not satisfactorily treating the wastewater to comply with required discharge limitations. In such a situation, the improperly treated water may be re-circulated back to the water source 20 to be re-treated. Thus, if either one of the pH or the turbidity of the treated water is not within required discharge limitations as the treated water passes through the third turbidity sensor 139 and the third pH sensor 140, the treated water will be sent back from where it came for retreatment through the wastewater treatment system 100. The operator will be alerted that the water is not meeting required discharge limitations so that any required maintenance can be made. Furthermore, the wastewater treatment system 100 may go through a system shut-down until the wastewater treatment system 100 is serviced.

Moreover, it may be determined that the incoming wastewater has a pH level and turbidity level that complies with required discharge limitations as it passes through the first pH sensor 102 and the first turbidity sensor 101. In such a circumstance, it would be redundant and not cost-effective to send that wastewater through the wastewater treatment system 100. Therefore, the wastewater treatment system 100 can be configured with a bypass line that will bypass the entire system and discharges the incoming wastewater directly to the desired location, such as a fresh water stream or the like. This bypass feature is a removable feature such that it can be removed or blocked off from the wastewater treatment system 100 entirely when it is undesirable.

Figure 11:
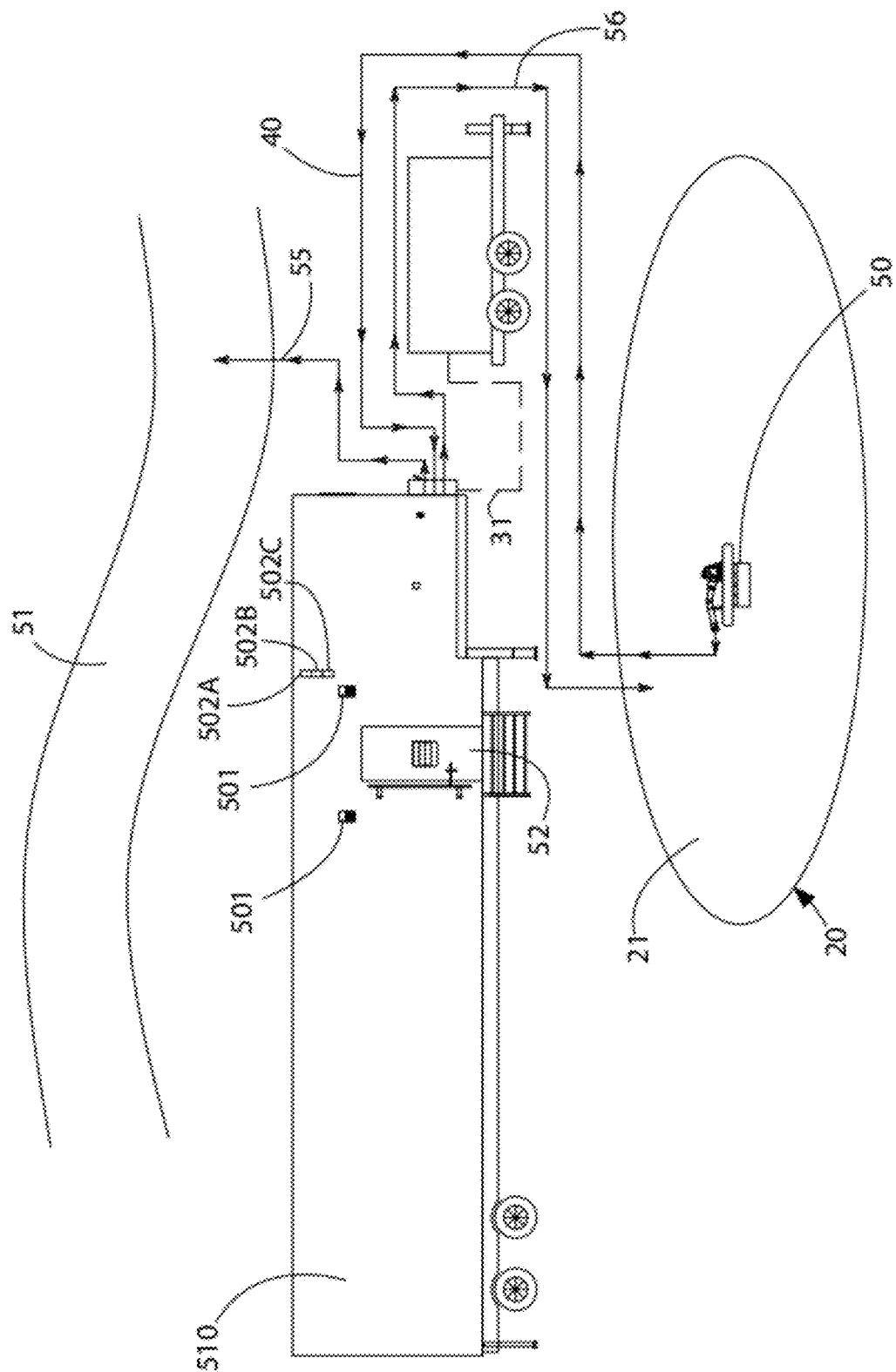
FIG. 11 is a side view of a trailer housing a wastewater treatment system in accordance with a second embodiment of the present invention.
Figure 12C:
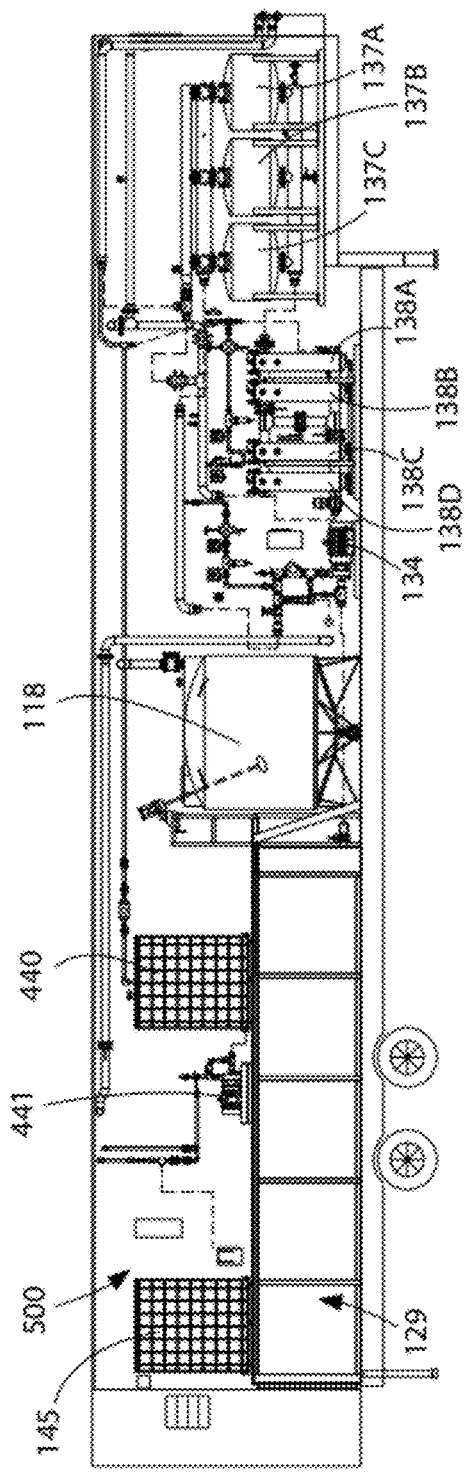
FIG. 12C is a driver side view of the wastewater treatment system housed within the trailer of FIG. 11 illustrating the piping and conduits.
Figure 12D:
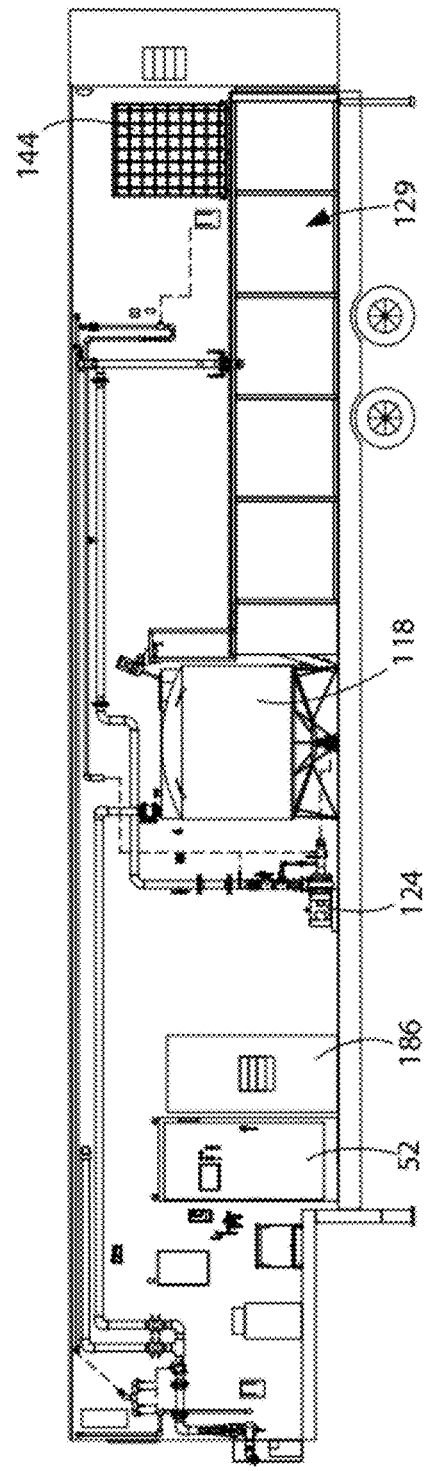
FIG. 12D is a passenger side view of the wastewater treatment system housed within the trailer of FIG. 11.
Figure 13:
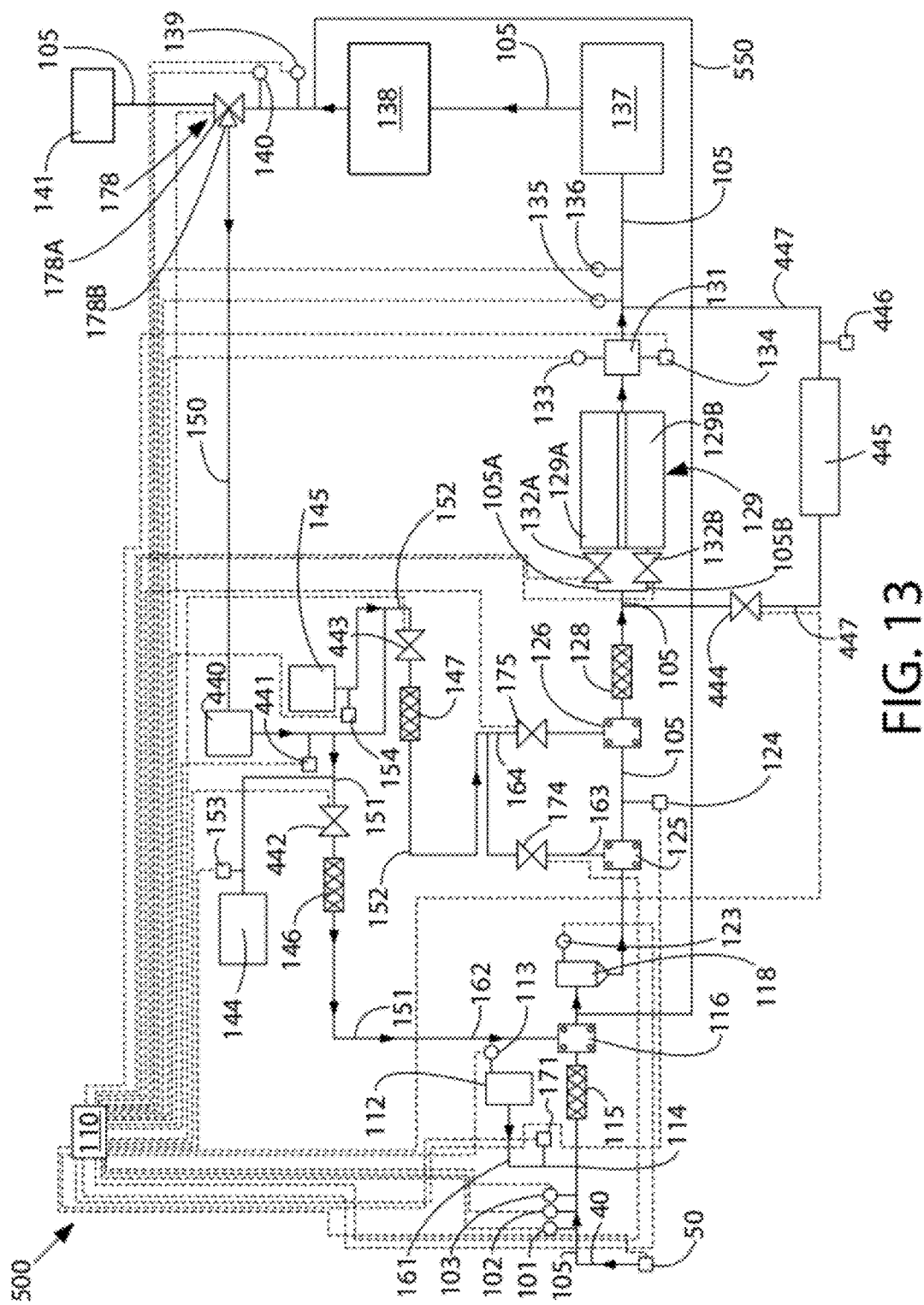
FIG. 13 is a schematic diagram of a wastewater treatment system in accordance with an embodiment of the present invention.

Referring now to FIGS. 11-13, a second embodiment of a wastewater treatment system 500 will be described. In describing the wastewater treatment system 500, many components, parts, tanks, valves, conduits, etc. will be the same as, those which were described above with regard to the wastewater treatment system 100. Thus, similar features and components will be similarly numbered and will not be described in detail below in the interest of brevity. It should be appreciated that various combinations of the wastewater treatment systems 100, 500 are possible and should be considered disclosed herein.

The wastewater treatment system 500 is housed within a trailer 510 which is similar to the trailer 10 described above. However, the trailer 510 includes a pair of flood lights 501 over the door 52 and a set of system alarm lights 502A-502C. The system alarm lights 502A-502C have been described in detail above and include a system clear light 502C, a system warning light 502B and a system alarm light 502A. When the system clear light 502C is illuminated, an operator will be made aware that the system is in proper operation and no maintenance is required. When the system warning light 502B is illuminated, the operator will be made aware that although the system is operating, there is an issue that needs the operator's attention. When the system alarm light 502A is illuminated, the operator will be made aware that a serious issue has arisen with the system, and likely the system will be shutdown at this time.

Another difference between the trailer 510 and the trailer 10 is that the trailer 510 includes a backwash line 56. The backwash line 56 takes all backwash water from the sand filter system 137 and flows the backwash water back into the water source 20. Thus all water that is used in the backwashing procedure will be taken back to the original source of the wastewater and will be retreated by the wastewater treatment system 500.

Referring now to FIGS. 12A-13 concurrently, the wastewater treatment system 500 will be further described. As noted above, only components and processes of the system 500 that are different from the system 100 will be described. All components and processes of the system 500 that are the same as has already been described with regard to the system 100 will be similarly numbered and not described in detail again in the interest of brevity.

In the wastewater treatment system 500, the polymer injection technique is different than in the wastewater treatment system 100. Specifically, the first aqueous polymer tank 117 and the second aqueous polymer tank 127 are omitted in the wastewater treatment system 500. Thus, the raw polymer and the recirculated water are not stored in a tank as a batch prior to injection into the wastewater treatment system 500 for treating the wastewater. Rather, the recirculated water and the raw polymers are mixed on the fly or dynamically, and then injected directly into the wastewater treatment system 500 without prior storage in a tank as an aqueous polymer mixture.

However, a clean water tank 440 is incorporated into the wastewater treatment system 500 to capture and retain water from the recirculation line 150. Thus, in the wastewater treatment system 500, the treated water flows from the recirculation line 150 into the clean water tank 440 and is held in the clean water tank 440 until its use to mix with the raw polymers in the first and second raw polymer tanks 144, 145 is desired. Thus, when it is determined that it is necessary to inject the aqueous polymer mixture into the wastewater treatment system 500, a pump 441 is operated to pump clean (i.e., recirculated) water from the clean water tank 440. The amount of recirculated water that is pumped from the clean water tank 440 is determined by the controller 110 in response to the turbidity, pH and flow rate data of the wastewater, that is transmitted to the controller 110.

Upon leaving the clean water tank 440, the clean water splits into the first refill line 151 and the second refill line 152. Upon entering the first refill line 151, a valve 442 is present that opens and closes when it is desired to mix the clean water with the first raw polymer stored in the first raw polymer tank 144. Thus, the clean water enters into the first refill line 151, passes through the valve 442 (which is operably coupled to the controller 110 for controlling opening and closing of the valve 442), and combines with the first raw polymer which is being pumped from the first raw polymer tank 144 via the pump 153. Once the clean water combines with the first raw polymer, the combined liquid passes through the mixer 146 to properly and adequately form the aqueous polymer mixture that is going to be used to treat the wastewater. After passing through the mixer 146, the aqueous polymer mixture flows directly into the polymer injector 116 in the manner as has been described in detail above. Thus, the aqueous polymer mixture is never stored in a tank. Rather, the raw polymer is stored in a raw polymer tank 144 and the clean water (i.e. recirculated water) is stored in a clean water tank 440, and the raw polymer is mixed with the recirculated water dynamically and then injected directly into the wastewater without being stored in a tank.

Similarly, the clean water that enters into the second refill line 152 reaches a valve 443 (which is operably coupled to the controller 110 for controlling opening and closing of the valve 443), and combines with the second raw polymer which is being pumped from the second raw polymer tank 145 via the pump 154. Once the clean water combines with the second raw polymer, the combined liquids pass through the mixer 147 to properly and adequately form the aqueous polymer mixture that is going to be used to treat the wastewater. After passing through the mixer 147, the aqueous polymer mixture flows directly into one of the second or third polymer injectors 125, 126 as desired and programmed by the system 500. Thus, as noted above the wastewater treatment system 500 eliminates the storage of the aqueous polymer mixture, but rather stores the clean water and the raw polymers in separate tanks, and then combines the clean water and the raw polymers dynamically or on the fly to create an aqueous polymer mixture that is injected directly into the wastewater.

Another difference in the wastewater treatment system 500 is the inclusion of a bypass line 550. One end of the bypass line 550 is operably and fluidly coupled to the treatment line 105 downstream of the first polymer injector 116 and the other end of the bypass line 550 is operably and fluidly coupled to the treatment line 105 at a location downstream of the bag filters 138. Of course, in other embodiments the first end of the bypass line 550 may be coupled to the treatment line 105 upstream of the first polymer injector 116 in instances where no treatment of the wastewater is desired because it is already providing turbidity and pH measurements that are within the required discharge limitations.

Yet another difference in the wastewater treatment system 500 is the inclusion of an additional separator 445, such as a Geotube, located external to the trailer 510. A flow line 447 is connected to the treatment line 105 downstream of the mixer 128 and upstream of the separator 129. Furthermore, a valve 444 is located on the flow line 447 to control the flow of wastewater into the flow line 447 and into the separator 445. In certain instances, it may be desirable to flow the wastewater to a location external to the trailer to remove the suspended solids, such as when the solids are excessively large in size. In this manner, the separator 445 can be larger than the separator 129 due to the size constraints within the trailer 510. Thus, the separator 445 is capable of handing larger particles for removal from the wastewater. A pump 446 is operably coupled to the separator 445 and to the controller 110. Thus, the system 500 is preprogrammed to operate the pump 446 to pump the water from the separator 445 as desired. The water leaving the separator 445 flows along the flow line 447 into the treatment line 105 at a location directly upstream of the sump 131 and downstream of the sand filters 137.

In certain of the claims of the present invention, the steps are written in a particular order. However, it should be understood that some of the steps can take place concurrently. Specifically, some of the steps occur in a continual manner such that those steps occur concurrently with the steps that precede and/or follow.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of treating wastewater comprising:
    a) introducing wastewater having a first turbidity level into a treatment line of a wastewater treatment system, the wastewater treatment system comprising a mixing tank receiving the wastewater introduced into the treatment line, a transfer pump operably coupled to the treatment line downstream of the mixing tank, a first injector operatively coupled to the treatment line, a second injector operatively coupled to the treatment line, a third injector operatively coupled to the treatment line, a mixing apparatus operably coupled inline with the treatment line downstream of the transfer pump, a separator operably coupled to the treatment line downstream of the mixing apparatus, and a recirculation line operably coupled to the treatment line downstream of the separator;
    b) injecting a first aqueous polymer mixture through the first injector into the wastewater flowing into the mixing tank to flocculate suspended solids within the wastewater, wherein the wastewater and flocculated suspended solids flowing into the mixing tank flow to the transfer pump;
    c) selectively injecting a second aqueous polymer mixture through one of the second injector or the third injector into the wastewater and flocculated suspended solids pumped by the transfer pump from the mixing tank to the mixing apparatus to further flocculate suspended solids within the wastewater, the second injector being downstream of the mixing tank and upstream of the transfer pump and the third injector being downstream of the transfer pump and upstream of the mixing apparatus;
    d) removing the flocculated suspended solids from the wastewater with the separator to form a treated water having a second turbidity level, the second turbidity level being lower than the first turbidity level;
    e) recirculating a portion of the treated water through the recirculation line to form a re-circulated portion of the treated water and discharging a remainder of the treated water to a desired location;
    f) introducing a first raw polymer into a first portion of the re-circulated portion of the treated water to form the first aqueous polymer mixture injected in step b); and g) introducing a second raw polymer into a second portion of the re-circulated portion of the treated water to form the second aqueous polymer mixture injected in step c).

2. The method of claim 1 further comprising:
measuring the first turbidity level of the wastewater prior to step b); and
wherein a flow rate of the first and second aqueous polymer mixtures injected into the wastewater in steps b) and c) is automatically adjusted based on the measured first turbidity level and a flow rate of the wastewater being introduced in step a).

3. The method of claim 1 further comprising:
measuring a pH level of the wastewater prior to step b); and
injecting a pH adjustment chemical into the wastewater, wherein a flow rate of the pH adjustment chemical injected into the wastewater is adjusted based on the measured pH level and a flow rate of the wastewater being introduced in step a).

4. The method of claim 1 wherein the separator comprises a permeable membrane, and wherein step d) further comprises removing the flocculated suspended solids from the wastewater by forcing the wastewater through each of the permeable membrane of the separator, a sand filter system and a bag filter system.

5. The method of claim 1 wherein steps b) and c) are performed simultaneously.

6. The method of claim 1 wherein the first aqueous polymer mixture injected in step b) is drawn from a batch of the first aqueous polymer mixture stored in a first polymer tank, the batch having a maximum volume;
wherein the first aqueous polymer mixture has a usable life cycle; and
wherein the maximum volume is selected so that at least a single turnover of the batch is achieved during the usable life cycle of the first aqueous polymer mixture.

7. The method of claim 1 further comprising:
f-1) storing a batch of the first aqueous polymer mixture that is formed by introducing the first raw polymer into the first portion of the re-circulated portion of the treated water in a first polymer tank, wherein the first aqueous polymer mixture injected in step b) is drawn from the batch of the first aqueous polymer mixture in the first polymer tank;
f-2) monitoring a liquid level of the batch of the first aqueous polymer mixture in the first polymer tank; and
f-3) upon the liquid level of the batch of the first aqueous polymer mixture in the first polymer tank falling below a predetermined lower threshold, forming an additional amount of the first aqueous polymer mixture and adding the additional amount of the first aqueous polymer mixture to the batch until the liquid level of the batch reaches a predetermined upper threshold; and
wherein the additional amount of the first aqueous polymer mixture is formed by introducing the first raw polymer into the first portion of the re-circulated portion of the treated water and flowing the first raw polymer and the first portion of the re-circulated portion of the treated water into a mixer prior to entering the first polymer tank, thereby mixing the first raw polymer and the first portion of the re-circulated portion of the treated water.

8. The method of claim 1 wherein the first raw polymer is different than the second raw polymer.

9. The method of claim 1 wherein the first and second aqueous polymer mixtures are injected into the wastewater simultaneously.

10. The method of claim 1 further comprising flowing the treated water through at least one of a sand filter system and a bag filter system after step d) and before step e).

11. A system for treating wastewater comprising:
a treatment line having an inlet for introducing wastewater into the system and an outlet for discharging treated water from the system;
a mixing tank operably coupled to the treatment line to receive the wastewater introduced into the treatment line;
a first polymer injector operably coupled to the treatment line upstream of the mixing tank to introduce a first aqueous polymer mixture into the wastewater flowing into the mixing tank to flocculate suspended solids within the wastewater;
a mixing apparatus operably coupled inline with the treatment line downstream of the mixing tank;
a transfer pump operably coupled to the treatment line and configured to pump wastewater and flocculated suspended solids received into the mixing tank to the mixing apparatus;
a separator operably coupled to the treatment line downstream of the transfer pump to remove flocculated suspended solids from the wastewater to form the treated water;
a first polymer tank containing a batch of the first aqueous polymer mixture and operably coupled to the first polymer injector;
a second polymer injector operably coupled to the treatment line and configured to introduce a second aqueous polymer mixture into the wastewater pumped between the mixing tank and the transfer pump;
a third polymer injector operably coupled to the treatment line and configured to introduce the second aqueous polymer mixture into the wastewater pumped between the transfer pump and the mixing apparatus, wherein the second and third polymer injectors are configured to selectively introduce the second aqueous polymer mixture into the wastewater through one of the second polymer injector or the third polymer injector;
a second polymer tank containing a batch of the second aqueous polymer mixture, the second polymer tank operably coupled to each of the second and third polymer injectors, the system configured to selectively inject the second aqueous polymer mixture into the treatment line via either the second polymer injector or the third polymer injector to further flocculate suspended solids within the wastewater;
a recirculation line operably coupled to the treatment line downstream of the separator, the recirculation line recirculating at least a portion of the treated water, the system configured to: (1) form the first aqueous polymer mixture from a first portion of the recirculated portion of the treated water and a first polymer; and (2) form the second aqueous polymer mixture from a second portion of the recirculated portion of the treated water and a second polymer.

12. The system of claim 11 further comprising:
a turbidity sensor operably coupled to the treatment line upstream of the first polymer injector to measure a turbidity level of the wastewater; and
wherein the system is configured to: (1) adjust a flow rate of the first aqueous polymer mixture being introduced into the treatment line by the first polymer injector based on the measured turbidity level and a flow rate of the wastewater; and (2) adjust a concentration level of the first polymer in the first aqueous polymer mixture based on the measured turbidity level and a flow rate of the wastewater.

13. The system of claim 12 further comprising a sensor flow line fluidly coupled to the treatment line, the turbidity sensor operably coupled to the sensor flow line, and wherein the wastewater flowing into the sensor flow line passes through a dole valve so that the flow rate of the wastewater flowing through the sensor flow line is constant.

14. The system of claim 11 further comprising:
a pH sensor operably coupled to the treatment line upstream of the first polymer injector to measure a pH level of the wastewater;
a pH adjustment chemical injector operably coupled to the treatment line to introduce a pH adjustment chemical into the treatment line; and
wherein the system is configured to adjust a flow rate of the pH adjustment chemical introduced into the treatment line by the pH adjustment chemical injector based on the measured pH level and a flow rate of the wastewater.

15. The system of claim 11 further comprising:
the mixing tank configured to mix the first aqueous polymer mixture with the wastewater to form a first polymer treated wastewater;
a variable frequency pump operably coupled to the treatment line to flow the first polymer treated wastewater from the mixing tank;
a liquid level sensor operably coupled to the mixing tank to monitor a liquid level of the first polymer treated wastewater in the mixing tank; and
wherein the system is configured to: (1) increase a speed of the variable frequency pump when the liquid level of the first polymer treated wastewater is above an upper threshold; and (2) decrease the speed of the variable frequency pump when the liquid level of the first polymer treated wastewater is below a lower threshold.

* * * * *